(12) United States Patent
Wright et al.

(10) Patent No.: US 11,634,239 B2
(45) Date of Patent: Apr. 25, 2023

(54) SYSTEMS AND METHODS FOR MOVING A VEHICLE COMPONENT RELATIVE TO THE VEHICLE STRUCTURE

(71) Applicant: The Boeing Company, Chicago, IL (US)

(72) Inventors: Robert Steven Wright, Seattle, WA (US); James Tane Iwamoto, Renton, WA (US); Jack William Mauldin, Mill Creek, WA (US); August West McKenna, Everett, WA (US); Richard Kevin Wilson, Bothell, WA (US); Bruce Allen Biskup, Bothell, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/382,144

(22) Filed: Apr. 11, 2019

(65) Prior Publication Data

US 2020/0324915 A1 Oct. 15, 2020

(51) Int. Cl.
*B64F 5/10* (2017.01)
*B66F 7/06* (2006.01)

(52) U.S. Cl.
CPC .............. *B64F 5/10* (2017.01); *B66F 7/0625* (2013.01)

(58) Field of Classification Search
CPC .. F01D 25/285; B64F 5/10; B64F 5/50; F05D 2230/68
See application file for complete search history.

(56) References Cited

U.S. PATENT DOCUMENTS

| 3,433,459 A | 3/1969 | Logan |
| 4,817,760 A * | 4/1989 | Yamamura .......... F16K 37/0041 74/491 |
| 5,188,247 A | 2/1993 | Jastrow |

(Continued)

FOREIGN PATENT DOCUMENTS

| FR | 3050675 A1 * | 11/2017 | ............. F16M 11/42 |
| WO | WO-2015185811 A1 * | 12/2015 | ................ B64F 5/50 |

OTHER PUBLICATIONS

Machine Translation of WO-2015185811-A1 (Year: 2015).*

(Continued)

*Primary Examiner* — Moshe Wilensky
*Assistant Examiner* — Kyle A Cook
(74) *Attorney, Agent, or Firm* — Kolisch Hartwell, P.C.

(57) ABSTRACT

Systems and methods for moving a vehicle component relative to the vehicle, the system including first and second upwardly-extending supports; a lift frame between the first and second supports including a crossbeam, and a pair of cambered truss assemblies secured to the crossbeam and configured to be attached to the vehicle component; movable first and second crossbeam support assemblies on the first and second supports to support the rotation of the crossbeam; a first lift mechanism configured to move the first crossbeam support assembly along the first support in response to a first control signal; a rotational drive mechanism configured to rotate the crossbeam relative to the first and second crossbeam support assemblies in response to a second control signal; and an electronic controller configured to generate the first and second control signals to change the position of the vehicle component relative to the vehicle.

31 Claims, 18 Drawing Sheets

(56) References Cited

U.S. PATENT DOCUMENTS

| | | | |
|---|---|---|---|
| 7,587,258 | B2 | 9/2009 | Marsh et al. |
| 7,756,321 | B2 | 7/2010 | Marsh et al. |
| 2002/0073535 | A1 | 6/2002 | Radowick |
| 2003/0090682 | A1 | 5/2003 | Gooch et al. |
| 2007/0210289 | A1* | 9/2007 | Drake ............... B66F 3/16 254/103 |
| 2010/0213429 | A1* | 8/2010 | Drake ............... B66F 7/10 254/89 R |
| 2011/0097187 | A1 | 4/2011 | Kelley et al. |
| 2011/0282483 | A1 | 11/2011 | Simonetti et al. |
| 2012/0110816 | A1* | 5/2012 | Groves ............... B66F 7/28 29/428 |
| 2018/0229861 | A1 | 8/2018 | LeCoutre et al. |
| 2018/0311808 | A1* | 11/2018 | Baugher ............... F01D 25/285 |
| 2019/0352158 | A1 | 11/2019 | Tani et al. |
| 2020/0290754 | A1* | 9/2020 | Chantal ............... B66F 5/025 |

OTHER PUBLICATIONS

Machine Translation of FR-3050675-A1 (Year: 2017).*

Civil Engineering X, Camber, available at https://civilengineeringx.com/structural-analysis/structural-steel/camber/, Screen shot taken on Apr. 9, 2018 (Year: 2018).*

Cambered Steel Beams and Steel Beams with Camber, Chicago Metal Rolled Products, Screen shot taken on Apr. 14, 2015, available at https://www.cmrp.com/blog/bending/beam-bending/cambered-steel-beams-and-steel-beams-with-camber.html (Year: 2015).*

European Patent Office, Extended European Search Report regarding European Patent Application No. 20163292.4, dated Oct. 28, 2020, 5 pages.

European Patent Office, Extended European Search Report regarding European Patent Application No. 20163118.1 dated Oct. 28, 2020, 5 pages.

Meagher, Hubert, Why Laser Trackers for 3D Precision Measurement?, Oasis, Nov. 19, 2014, 9 pages.

U.S. Patent and Trademark Office, Non-Final Office Action regarding U.S. Appl. No. 16/382,138, dated Jan. 22, 2021, 24 pages.

U.S. Patent and Trademark Office, Final Office Action regarding U.S. Appl. No. 16/382,138, dated Aug. 4, 2021, 19 pages.

U.S. Patent and Trademark Office, Non-Final Office Action regarding U.S. Appl. No. 16/382,138, dated Feb. 16, 2022, 25 pages.

* cited by examiner

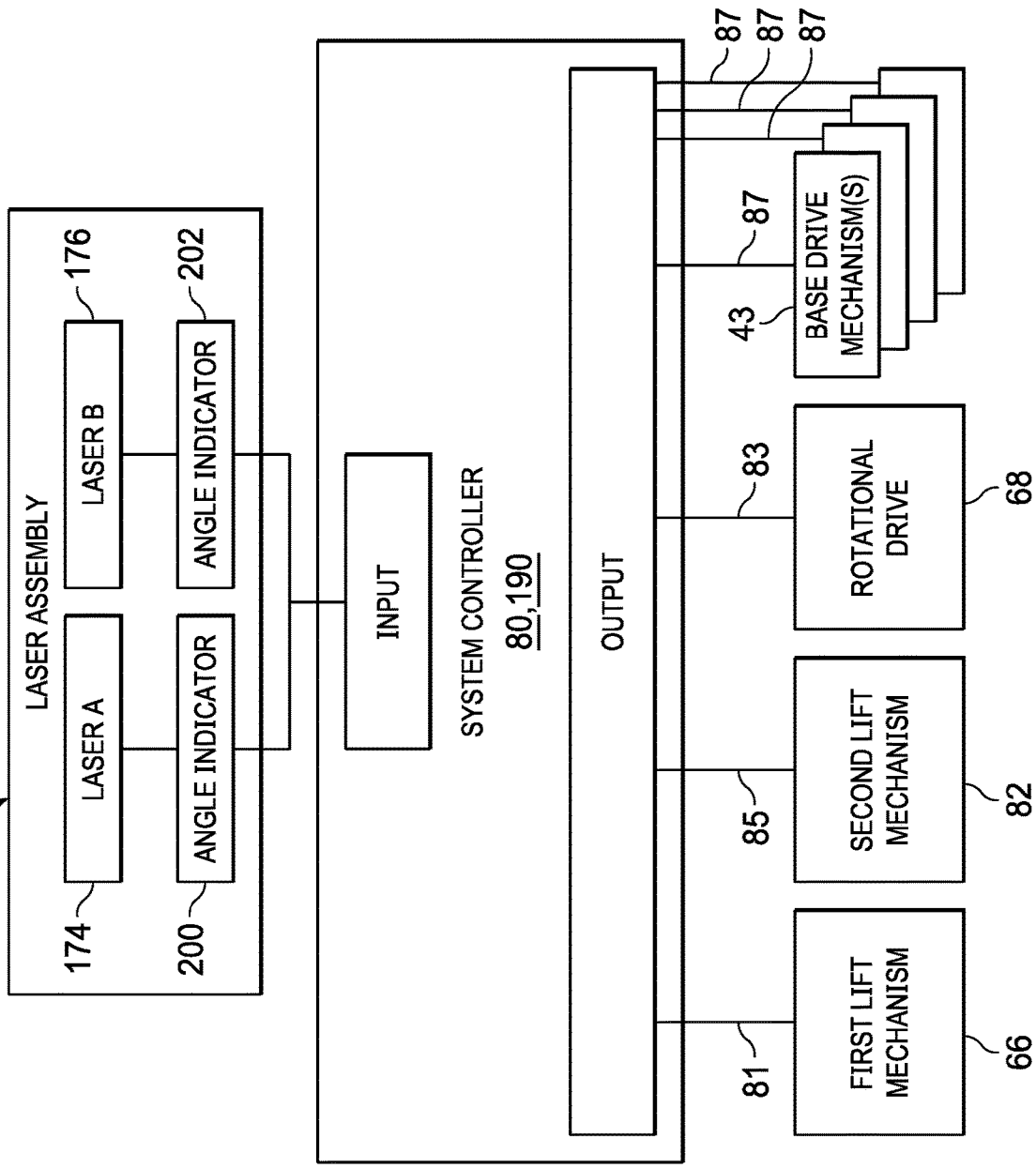

SYSTEMS AND METHODS FOR MOVING A VEHICLE COMPONENT RELATIVE TO THE VEHICLE STRUCTURE

FIELD

This disclosure relates to aircraft manufacturing processes. More specifically, the disclosed embodiments relate to systems and methods for positioning and aligning aircraft components relative to the aircraft or to aircraft structural features.

INTRODUCTION

The manufacture and service of large commercial aircraft often present special challenges. In particular, the power plants of such aircraft are not only large and mechanically complex, but their assembly may require high precision in order to accommodate the close tolerances typically required.

This is particularly true for the turbofan power plants used by many commercial aircraft. A turbofan power plant for an aircraft is typically housed within a nacelle 2 that is attached to a wing 4 of an aircraft 6 via an engine strut (or pylon) 8. Some components of engine nacelles are shown in FIG. 1, and may include an inlet cowl 10, fan cowls 12, thrust reversers 13, exhaust nozzle assembly 16, and of course the turbofan engine assembly 18 itself, among other components.

Installation processes for many of the large nacelle components may require a crane and several skilled personnel, as depicted in FIG. 2 for the installation of a thrust reverser 13 onto the pylon 8 of aircraft 6. Thrust reverser 13 may be secured to, and hoisted by, crane lines 20. While suspended from the crane, personnel 22 present on a work surface 24 may guide the thrust reverser 13 into position by hand, while an additional mechanic 26 may be required to perch on top of engine strut 8 to guide thrust reverser 13 into proper position for installation. This may require mechanic 26 to lean outward over work surface 24 of the factory floor perhaps a dozen or more feet below in order to guide the nacelle component into place by eye, all while perched on the uneven and typically angled surface of engine strut 8. Not only does this create the potential for falling and accompanying injury, but when the nacelle fairings are absent such a fall may result in a landing on engine components.

In addition, for many installations, the mechanic on strut 8 must also directly assist with installation. Thrust reverser 13 typically attaches to engine strut 8 via a hinge assembly 28 as shown in FIGS. 3A-3D, and once the thrust reverser is guided into an appropriate position so that the first hinge component 30 (typically the hinge lug) attached to engine strut 8 is aligned with second hinge component 32 (typically the hinge clevis) on the thrust reverser, mechanic 26 may be required to reach downward and insert the requisite hinge pin 34 into the hinge assembly to secure the thrust reverser to the nacelle, followed by installation of an appropriate nut.

Installing such nacelle components therefore represents a delicate and time-consuming operation requiring large pieces of airplane structure be gently and slowly brought together, and placed into alignment, while suspended from the air. The movement of these components may be guided by hand and by eye, and so may require a worker with excellent judgment, extensive experience, and/or specialized training. Furthermore, because such operations may require the use of an overhead crane, equipment which may be in high demand on the factory floor, the operation threatens to create a bottleneck in operations until it is complete.

What is needed are systems and methods to help automate selected aspects of the installation of such large nacelle components, potentially streamlining such processes as well as increasing worker safety.

SUMMARY

The present disclosure provides systems and methods for moving a vehicle component relative to the vehicle.

In some embodiments, the disclosure provides a system for moving a vehicle component of a vehicle relative to a structure of the vehicle during installation of the component on the structure, the system including: Spaced-apart first and second supports mounted to a base on opposite sides of a component bay region of the base, the first and second supports extending upwardly from the base; a lift frame including a crossbeam extending between the first and second supports along a beam axis, and a pair of spaced-apart cambered truss assemblies secured to the crossbeam and configured to be attached to and support the vehicle component relative to the crossbeam; first and second crossbeam support assemblies on the first and second supports, configured to support the crossbeam for rotation of the crossbeam relative to the first and second supports, the first and second crossbeam support assemblies being movable along the first and second supports; a first lift mechanism configured to move the first crossbeam support assembly along the first support in response to a first control signal; a rotational drive mechanism configured to rotate the crossbeam about the beam axis relative to the first and second crossbeam support assemblies in response to a second control signal; and an electronic controller operatively coupled to the first lift mechanism and the rotational drive mechanism, configured to generate the first control signal controlling operation of the first lift mechanism to move the first crossbeam support assembly along the first support, and to generate the second control signal controlling operation of the rotational drive mechanism to rotate the crossbeam relative to the first crossbeam support assembly, to thereby change the position of the vehicle component relative to the vehicle.

In some embodiments, the disclosure provides a method of moving a vehicle component of a vehicle relative to a structure of the vehicle during installation of the component on the structure, the method including: Attaching a lift frame to the vehicle component, where the lift frame includes a crossbeam and a pair of spaced-apart cambered truss assemblies attached to the crossbeam, and attaching the lift frame to the vehicle component includes securing the pair of truss assemblies to the vehicle component at a plurality of spaced locations; supporting a first end of the crossbeam with a first crossbeam support assembly; moving by a first lift mechanism in response to a first control signal the vehicle component by moving the first crossbeam support assembly along a first support mounted to and extending upwardly from a base supported on a work surface; rotating by a rotational drive mechanism in response to a second control signal the lift frame and the attached vehicle component about a beam axis relative to the first crossbeam support assembly to change the orientation of the vehicle component relative to the vehicle; and changing the orientation of the vehicle component relative to the vehicle by generating by an electronic controller the first control signal controlling operation of the first lift mechanism to move the first crossbeam support assembly along the first support, and the second control signal for controlling operation of the rotational drive mechanism to rotate the lift frame and the attached vehicle component relative to the first crossbeam support assembly.

In some embodiments, the disclosure provides a system for moving a vehicle component of a vehicle relative to a structure of the vehicle during installation of the component on the structure, the system including: spaced-apart first and second supports mounted to a base on opposite sides of a component bay region of the base, the first and second supports extending upwardly from the base; a lift frame including a crossbeam extending along a crossbeam line between the first and second supports, and a pair of spaced-apart cambered truss assemblies secured to the crossbeam and configured to be attached to and support the vehicle component relative to the crossbeam; a first and second crossbeam support assemblies on the first and second supports, configured to support the crossbeam relative to the first and second supports, the first and second crossbeam support assemblies being movable along the first and second supports; a first lift mechanism configured to move the first crossbeam support assembly along the first support in response to a first control signal; a second lift mechanism configured to move the second crossbeam support assembly along the second support in response to a second control signal; and an electronic controller operatively coupled to the first and second lift mechanisms, configured to generate the first control signal controlling operation of the first lift mechanism to move the first crossbeam support assembly along the first support, and to generate the second control signal controlling operation of the second lift mechanism to move the second crossbeam support assembly along the second support, to thereby change the position of the vehicle component relative to the vehicle.

BRIEF DESCRIPTION OF THE DRAWINGS

FIG. 10 is a schematic depicting an illustrative control system for a system for moving a vehicle component, according to the present disclosure.

DESCRIPTION

Overview

Figure 1:
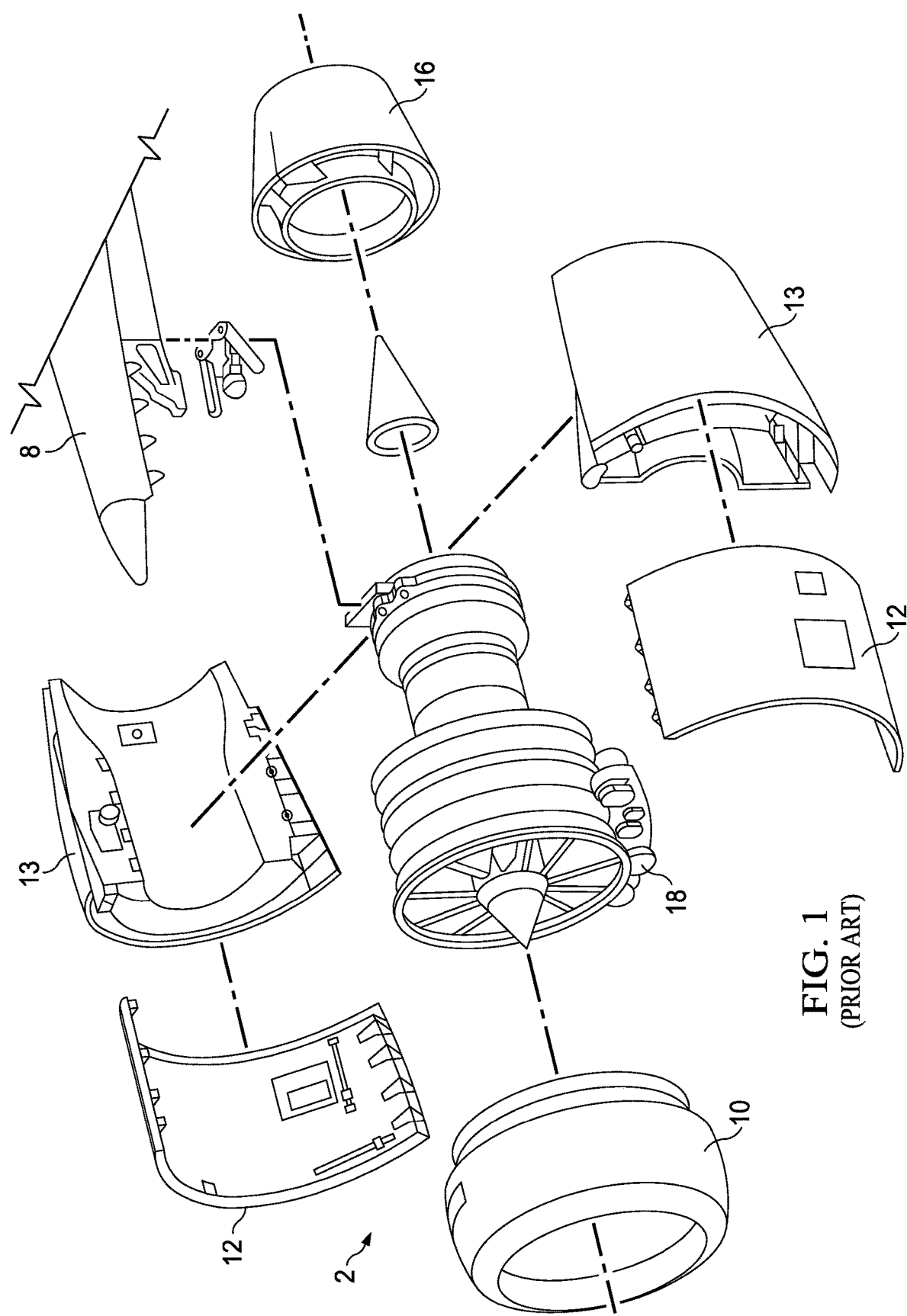
FIG. 1 depicts various components of a turbofan engine nacelle in an exploded view.
Figure 2:
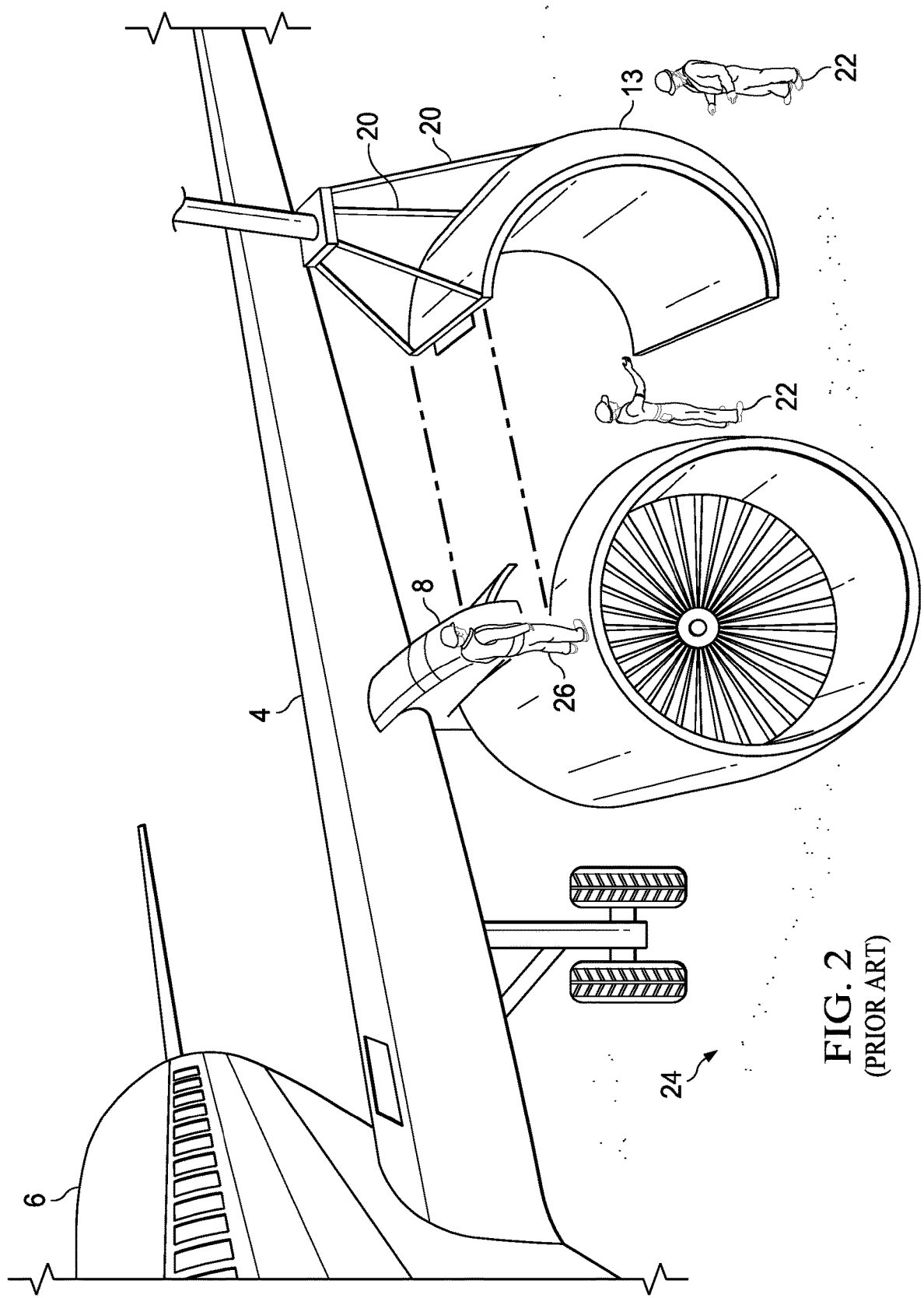
FIG. 2 semi-schematically illustrates an installation process for a component of an engine nacelle.
Figure 3A:
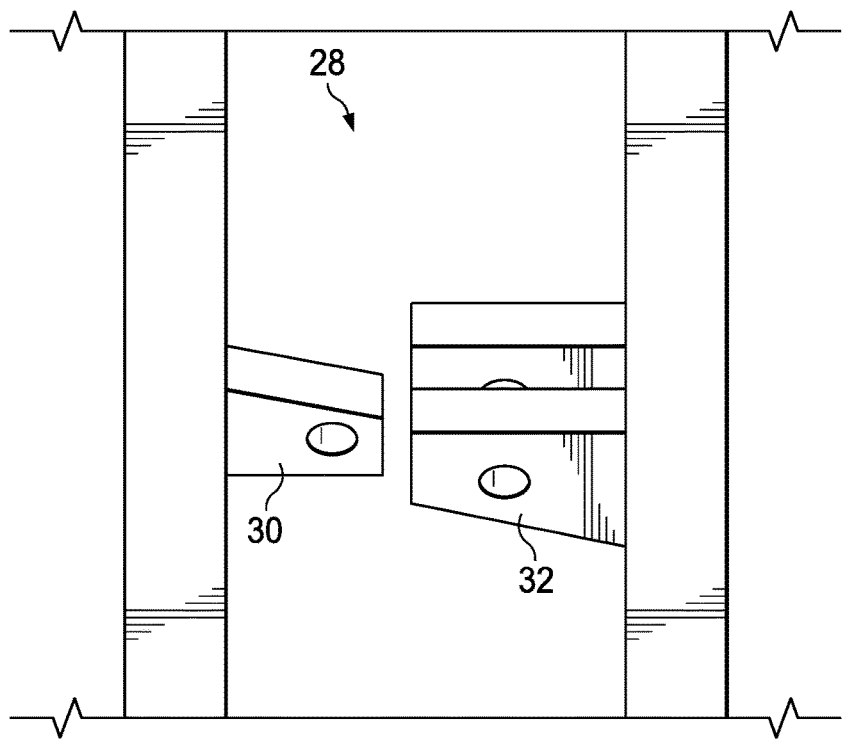
FIG. 3A depicts the lug and clevis portions of a representative hinge assembly being brought together.
Figure 3B:
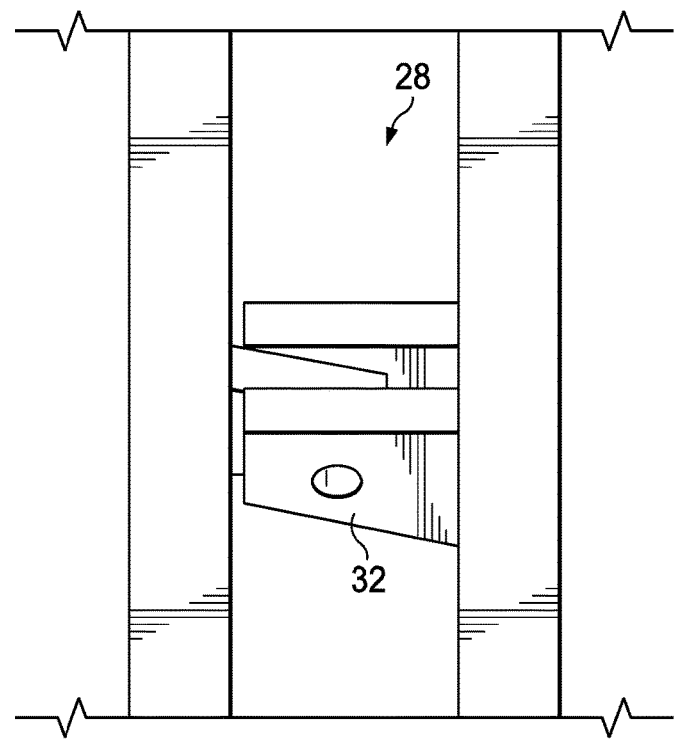
FIG. 3B depicts the lug and clevis portions in an aligned configuration.
Figure 3C:
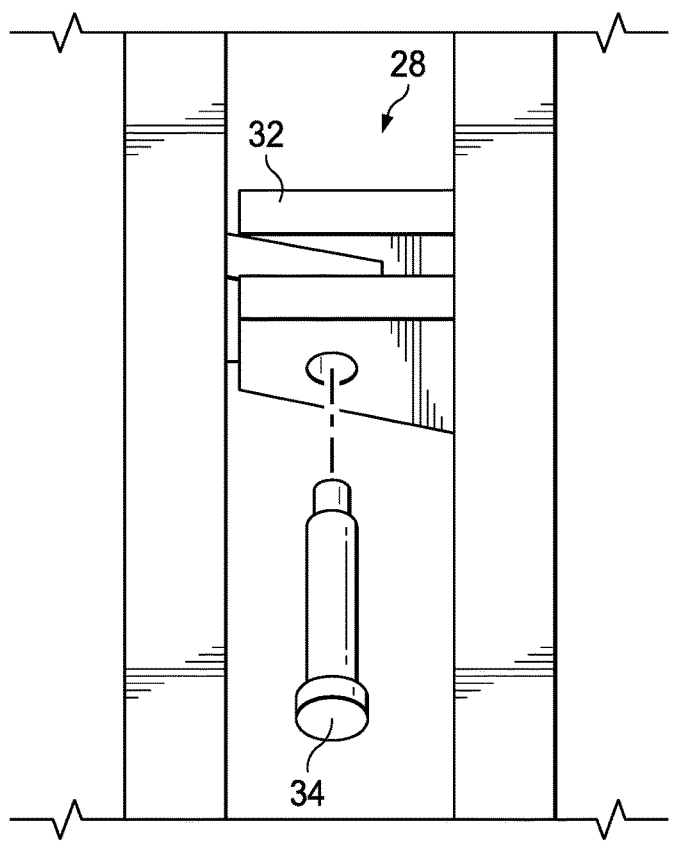
FIG. 3C depicts a hinge pin being positioned within the lug and clevis portions.
Figure 3D:
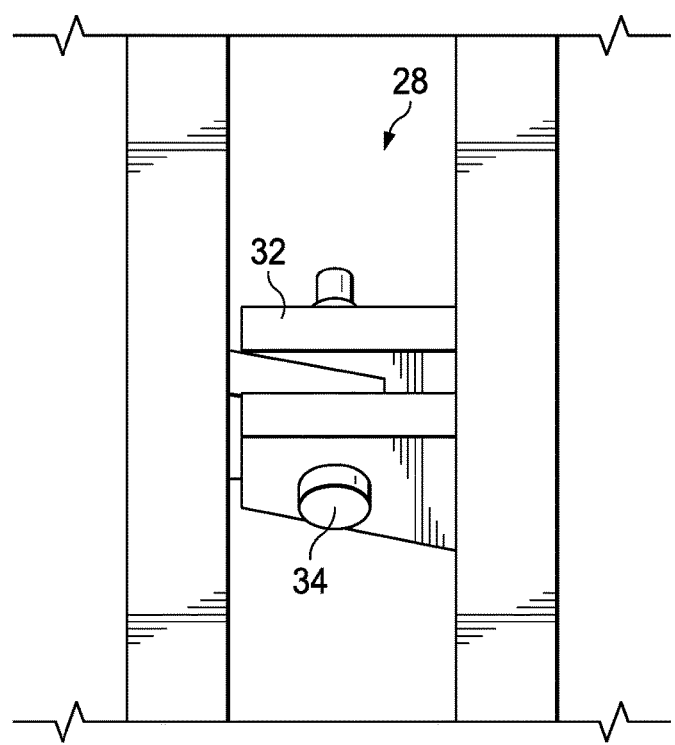
FIG. 3D depicts the hinge pin fully installed in the hinge and ready to be secured by an appropriate nut.
Figure 4:
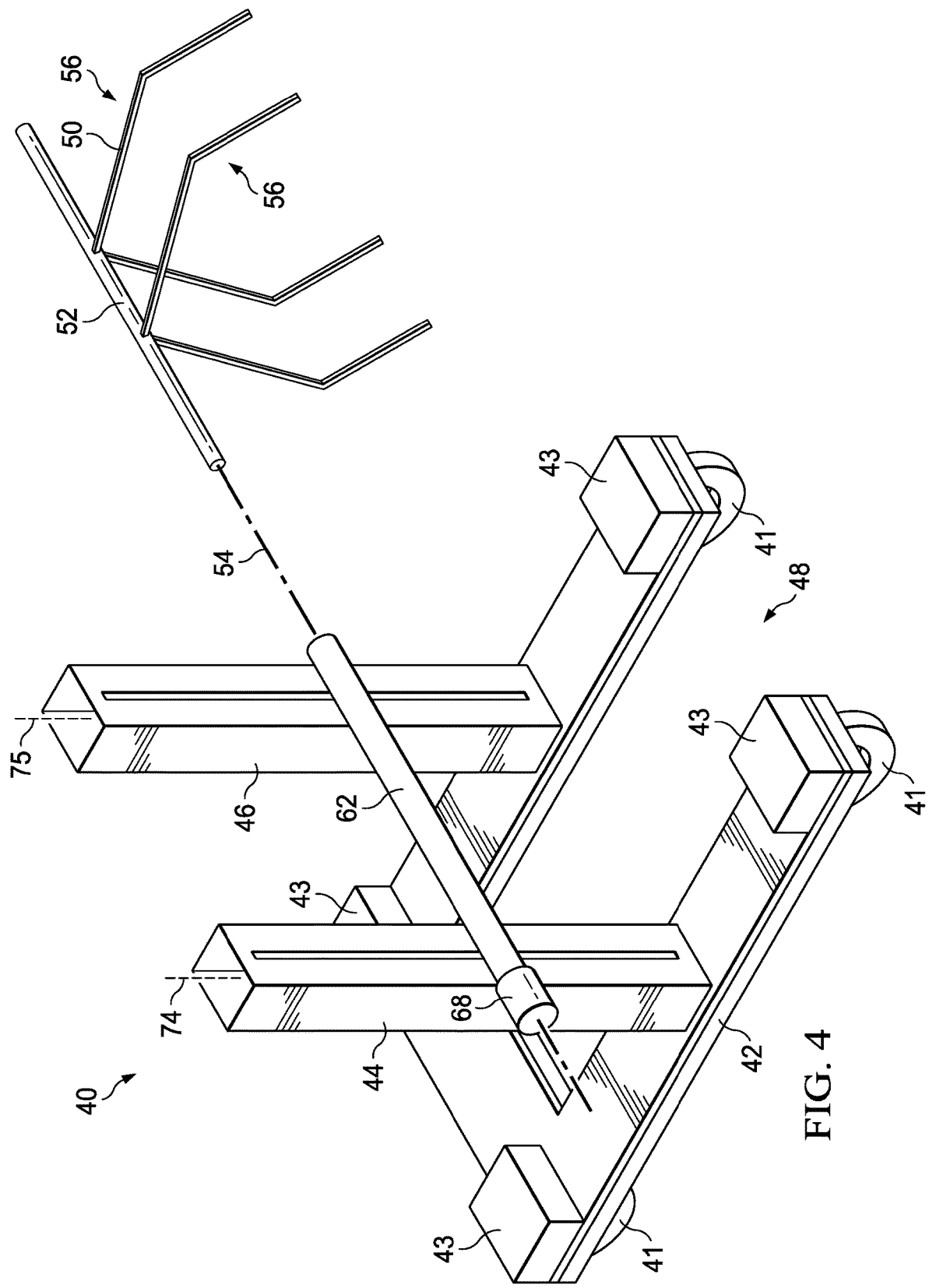
FIG. 4 semi-schematically depicts an illustrative system for moving a vehicle component, according to the present disclosure.

Various embodiments of moving and positioning systems for positioning components of a vehicle are described below and illustrated in the associated drawings. Unless otherwise specified, the disclosed systems and/or their various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other moving or positioning systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

In particular, while the moving and positioning systems of the present disclosure may be illustrated in the context of aircraft manufacture, and moving and positioning engine components of an aircraft, the disclosed systems may be used in conjunction with the manufacture and/or assembly of any of a variety of vehicles or other structures. The present disclosure should not be considered in any way limited to the specific applications and examples illustrated herein.

Moving Systems

A system 40 for moving a vehicle component is shown in FIGS. 4-9. System 40 may have utility for the movement of any of a variety of vehicle components, but may exhibit particular utility for moving a vehicle component such as thrust reverser 13, among other components, relative to the structure of the vehicle 6, and may particularly facilitate installation of the component on the structure of the vehicle.

System 40 may include a base 42, equipped with a plurality of wheels 41, so that base 42 is movable. Base 42 may be further equipped with one or more base-drive mechanisms 43 to supply power to wheels 41. As depicted in the illustrative embodiment, each wheel 41 may have a dedicated base-drive mechanism 43 to supply power to that wheel. As each base-drive mechanism 43 may be powered individually, base 42 of system 40 may be maneuvered as desired by differentially powering each base-drive mechanism to move base 42 in any direction.

System 40 may include spaced-apart first 44 and second 46 upright supports mounted to base 42 so as to be on opposite sides of a component bay region 48 of base 42. First 44 and second 46 supports may be mounted to base 42 so that the first 44 and second 46 upright supports extend upwardly from base 42.

System 40 may further include a lift frame 50, where the lift frame includes a crossbeam 52 extending between first 44 and second 46 upright supports along a beam axis 54, or crossbeam line, where beam axis 54 is defined by the longitudinal axis of crossbeam 52. Lift frame 50 may further include a pair of spaced-apart and cambered truss assemblies 56 that are secured to crossbeam 52, where truss assemblies 56 are configured to be attached to and support vehicle component 14 relative to crossbeam 52.

System 40 may further include a first 58 and a second 60 crossbeam support assembly movably coupled to the first 44 and second 46 upright supports, so that first 58 and second 60 crossbeam support assemblies are configured to support crossbeam 52, and may be moved along the first 44 and second 46 upright supports. First 58 and second 60 crossbeam support assemblies may be configured to support crossbeam 52 relative to first 44 and second 46 upright supports. First 58 and second 60 crossbeam support assemblies may include a tubular outer support beam 62 extending between first 44 and second 46 upright supports, more particularly, support beam 62 may be configured so that tubular outer support beam 62 encloses crossbeam 52.

Figure 6:
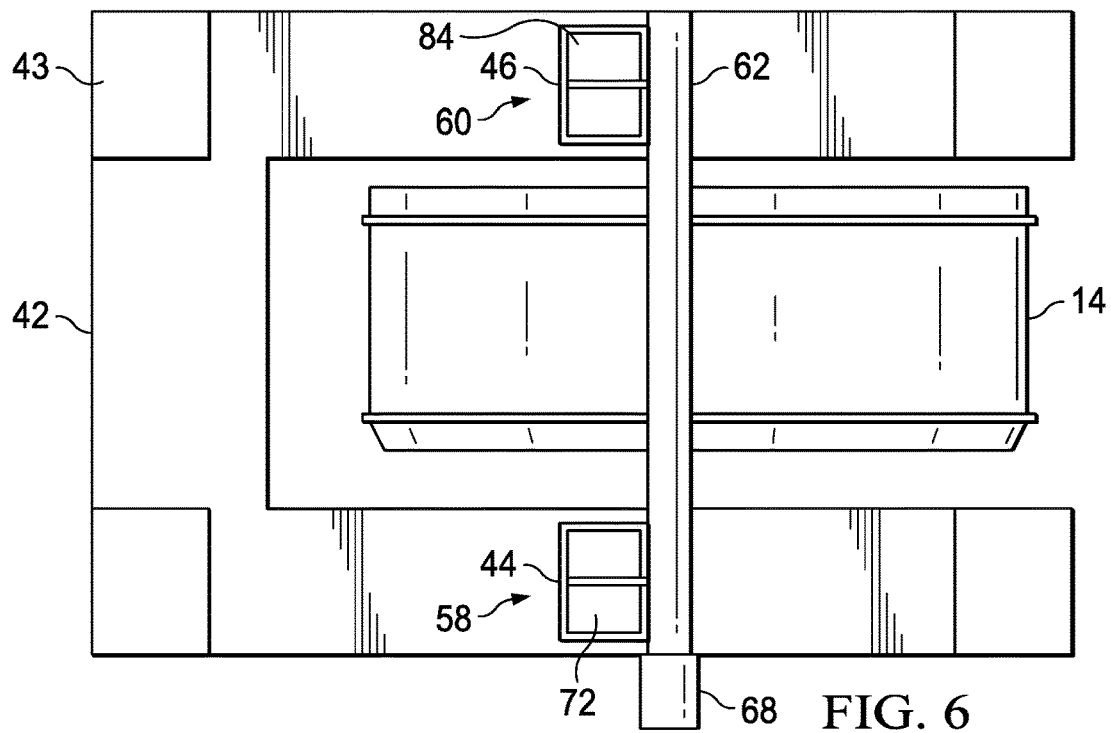
FIG. 6 is a top plan view of the illustrative system of FIG. 4 in association with a vehicle component.
Figure 7:
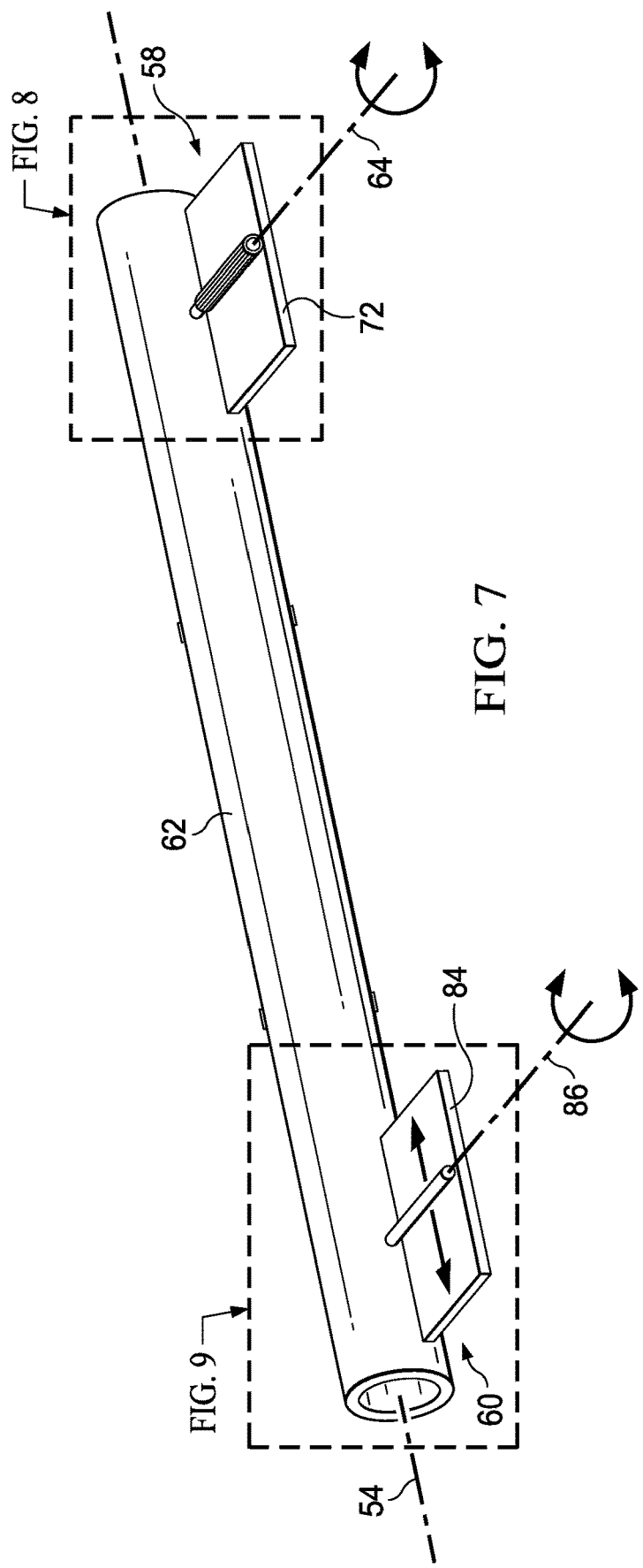
FIG. 7 depicts a crossbeam support member, a first crossbeam support assembly, and a second crossbeam support assembly of the system of FIG. 4.

First 58 and second 60 crossbeam support assemblies may be at least substantially enclosed within the first 44 and second 46 upright supports, respectively, while supporting outer support beam 62 outside the upright supports, as shown in FIG. 6. In one aspect of the present disclosure first support member 72, first crossbeam support assembly 58, and crossbeam 52 may be collectively configured to allow crossbeam 52 to pivot about a first pivot axis 64 that is transverse to beam axis 54. In the preferred embodiment shown, pivot axis 64 is fixed relative to upright support 44. In some embodiments, such when the first and second crossbeam support assemblies are reversed in position, first crossbeam support assembly 58 and crossbeam 52 may be collectively configured to allow crossbeam 52 to move laterally with respect to first support member 72, as is shown for second crossbeam support assembly 60 in the illustrated embodiment.

System 40 may include a first lift mechanism 66 that is configured to move the first crossbeam support assembly 58 along the first upright support 44 in response to a first control signal, and a rotational drive mechanism 68 that is configured to rotate crossbeam 52 about beam axis 54 relative to the first 58 and second 60 crossbeam support assemblies in response to a second control signal. First 58 and second 60 crossbeam support assemblies are configured to support crossbeam 52 as it is rotated about axis 54, and pivoted about axes 64 and 86 relative to the first 44 and second 46 upright supports.

Figure 5:
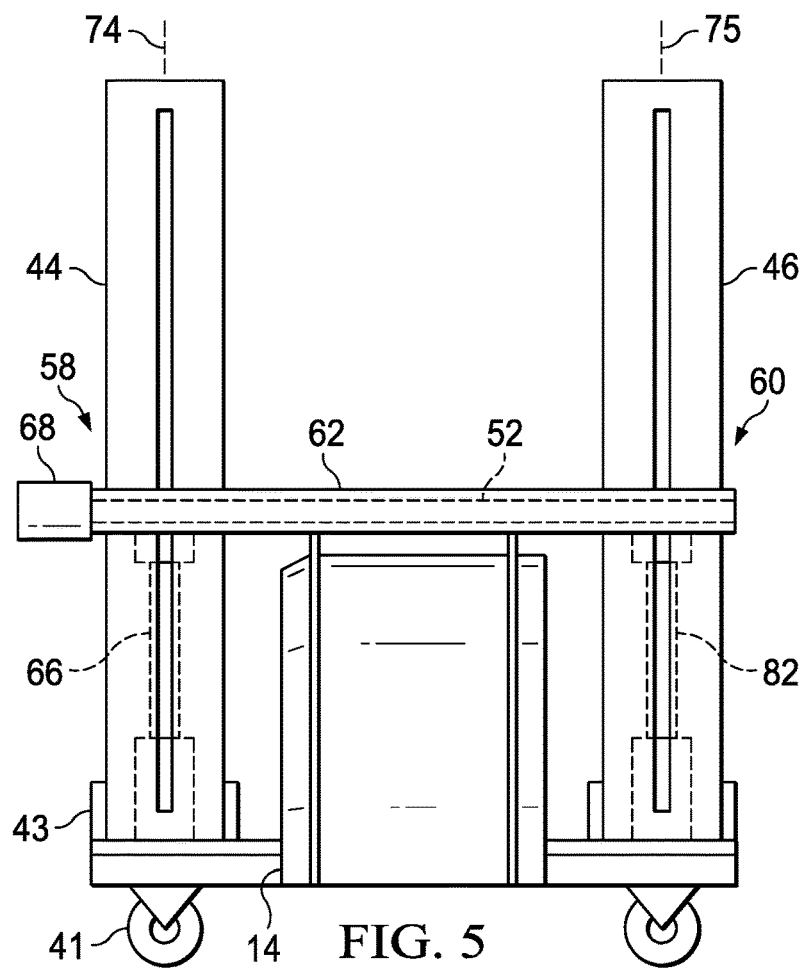
FIG. 5 is a front elevation view of the illustrative system of FIG. 4 in association with a vehicle component, where portions of the first and second upright trusses are illustrated in partial cutaway to depict the first and second lift mechanisms within the upright trusses.

First crossbeam support assembly 58 may include a first crossbeam support element 70, shown as a portion of outer support beam 62, supporting crossbeam 52, first support member 72 supported by the first lift mechanism 66 for movement along a first lift line 74 along first upright support 44, and a pivot pin 76 pivotingly coupling first crossbeam support element 70 to first support member 72. First lift mechanism 66 may be disposed within upright support 44, beneath and operatively coupled to first support member 72, as shown in FIG. 5.

First crossbeam support assembly 58 may further include a sleeve 78 fixedly mounted to one of first crossbeam support element 70 of outer support beam 62 and first support member 72, and pivot pin 76 may be pivotingly supported in sleeve 78 and supported by the other of first crossbeam support element 70 and first support member 72. In the example shown, pin 76 is rigidly attached to outer support beam 62 and sleeve 78 is rigidly attached to support member 72, such as by welding, thereby preventing pin 76, outer support beam 62, and crossbeam 52 from moving laterally of lift line 74 along upright support 44.

System 40 may be controlled by an electronic system controller 80 operatively coupled to the plurality of base drive mechanisms 43, and configured to generate control signals to the base drive mechanisms 43 via the conductor(s) 87 to change the position of base 42 of system 40 by selectively rotating base wheels 41 to achieve the desired motion for base 42.

System 40 may be controlled by an electronic system controller 80 operatively coupled to first lift mechanism 66, and rotational drive mechanism 68, as shown in the diagram of FIG. 10. Electronic system controller 80 may be configured to generate a first control signal controlling operation of first lift mechanism 66 via conductor 81 in order to move first crossbeam support assembly 58 along the first support member 72. Electronic system controller 80 may be similarly configured to generate a second control signal controlling operation of rotational drive mechanism 68 via conductor 83 in order to rotate crossbeam 52 relative to first crossbeam support assembly 58. In this way electronic system controller 80 may be capable of changing the position of vehicle component 14 relative to vehicle 6.

In one aspect of the present disclosure, electronic system controller 80 may be configured to receive input information associated with an objective position of vehicle component 14, and in response to the received input information, electronic system controller 80 may generate the first control signal for controlling operation of the first lift mechanism 66 to move first crossbeam support assembly 58 along first support member 72, and generate the second control signal for controlling operation of rotational drive mechanism 68 to rotate crossbeam 52 relative to first crossbeam support assembly 58 so as to rotationally position vehicle component 14 when supported by lift frame 50.

In one aspect of the present disclosure, second upright support 46, second crossbeam support assembly 60, and crossbeam 52 are collectively configured to allow crossbeam 52 to pivot as well as move laterally with respect to second upright support 46. Second crossbeam support assembly 60 may include a second crossbeam support element 79, shown as a portion of outer support beam 62, supporting crossbeam 52, a second support member 84 supported by the second lift mechanism 82 for movement along a second lift line 75 along second upright support 46, and a pivot pin 88 pivotingly coupling second crossbeam support element 79 to second support member 84. Second lift mechanism 82 may be disposed within upright support 46, beneath and operatively coupled to second support member 84, as shown in FIG. 5.

Second lift mechanism 82 is configured to move second crossbeam support assembly 60 along second support member 84 in response to a third control signal via conductor 85 as shown in FIG. 10. In this aspect of the disclosure, electronic system controller 80 may be operatively coupled to second lift mechanism 82 and configured to generate the third control signal controlling operation of second lift mechanism 82 in order to move second crossbeam support assembly 60 along second support member 84 and thereby change the position of vehicle component 14 relative to vehicle 6. Second lift mechanism 82 may be disposed within upright support 46, beneath and operatively coupled to second support member 84, as shown in FIG. 5.

In one aspect of the present disclosure, electronic system controller 80 may be configured to receive input information associated with an objective position of vehicle component 14, and in response to the received input information, electronic system controller 80 may generate the first control signal for controlling operation of the first lift mechanism 66 to move first crossbeam support assembly 58 along first support member 72, and generate the second control signal for controlling operation of rotational drive mechanism 68 to rotate crossbeam 52 relative to first crossbeam support assembly 58 so as to rotationally position vehicle component 14 when supported by lift frame 50. Second cross beam support assembly 60 may be configured so that, when crossbeam 52 is rotated relative to first crossbeam support assembly 58, crossbeam 52 may additionally be free to rotate around a second pivot axis 86 that is transverse to the beam axis 54 by rotating around second pivot pin 88 while the second crossbeam support assembly 60 is supported by second pivot pin 88.

Figure 8:
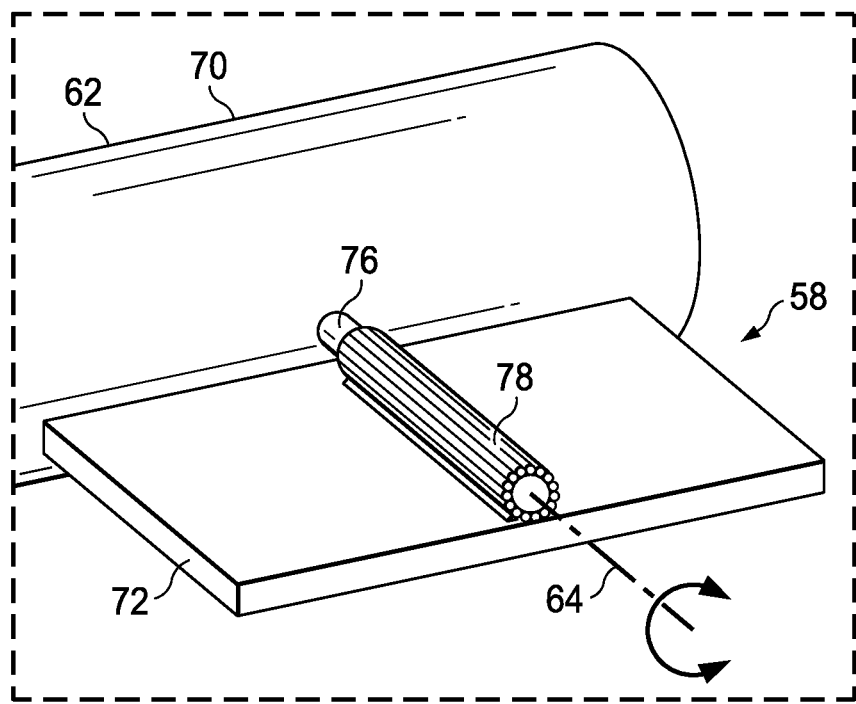
FIG. 8 depicts the first crossbeam support assembly of the system of FIG. 4.
Figure 9:
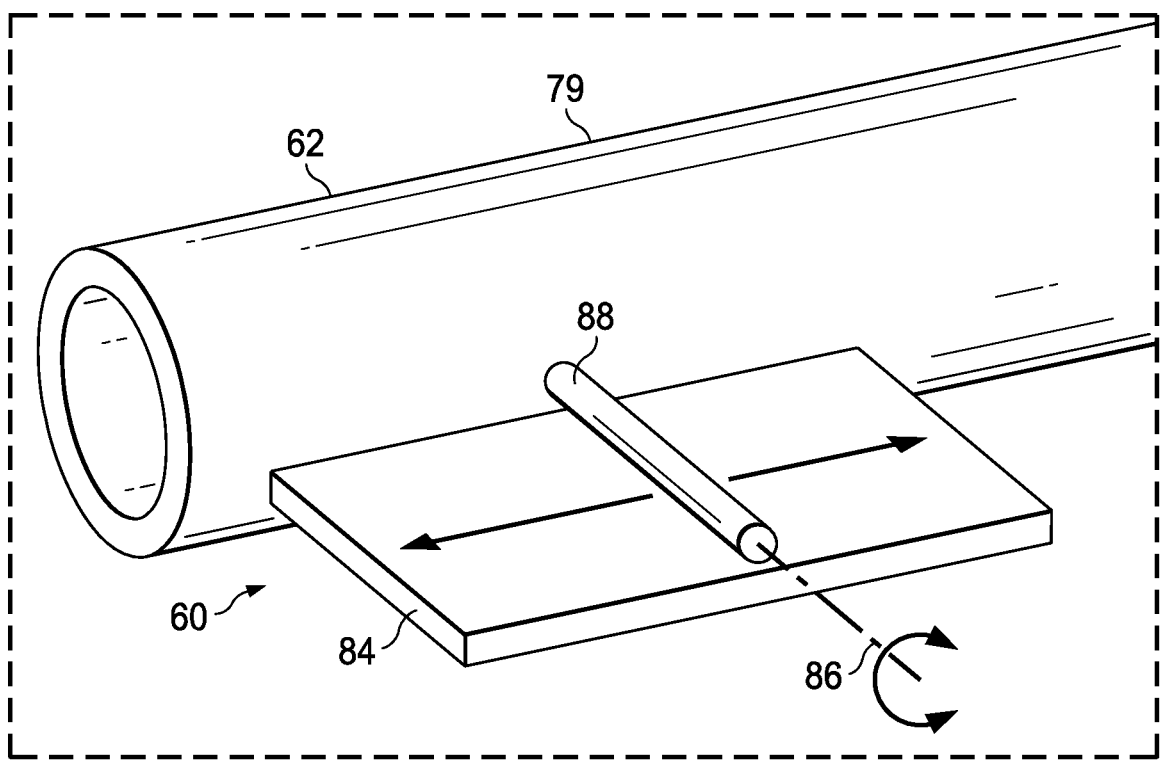
FIG. 9 depicts the second crossbeam support assembly of the system of FIG. 4.

In another aspect of the present disclosure, system 40 may include an electronic system controller 80 operatively coupled to first lift mechanism 66 and second lift mechanism 82, where electronic system controller 80 may be configured to generate the first control signal controlling operation of first lift mechanism 66 to move first crossbeam support assembly 58 along first support member 72, and to generate the second control signal controlling operation of second lift mechanism 68 to move second crossbeam support assembly 60 along second support member 84. During movement of second crossbeam support assembly along second support member 84, second crossbeam support element 79, and thereby outer support beam 62 and crossbeam 52, are allowed to pivot about axis 86 as well as move laterally along second support member 84 via rotation and lateral movement of second pivot pin 88 relative to second support member 84, to thereby change the position of vehicle component 14 relative to vehicle 6. It will be appreciated that since pivot pin 76 is fixed in lateral position relative to first support member 72, pivoting of outer support beam 62 and crossbeam 52 about pin 76, as shown in FIG. 8, causes the lateral position of pin 88 to change. This change is accommodated by the lateral movement of pin 88 among second support member 84.

In this aspect of system 40, electronic system controller 80 may be configured to receive input information associated with an objective position of vehicle component 14, and in response to the received input information to generate the first control signal for controlling operation of first lift mechanism 66 to move first crossbeam support assembly 58 along first support member 72, and to generate the second control signal for controlling operation of second lift mechanism 82 to move second crossbeam support assembly 60 along the second support member 82.

Figure 11A:
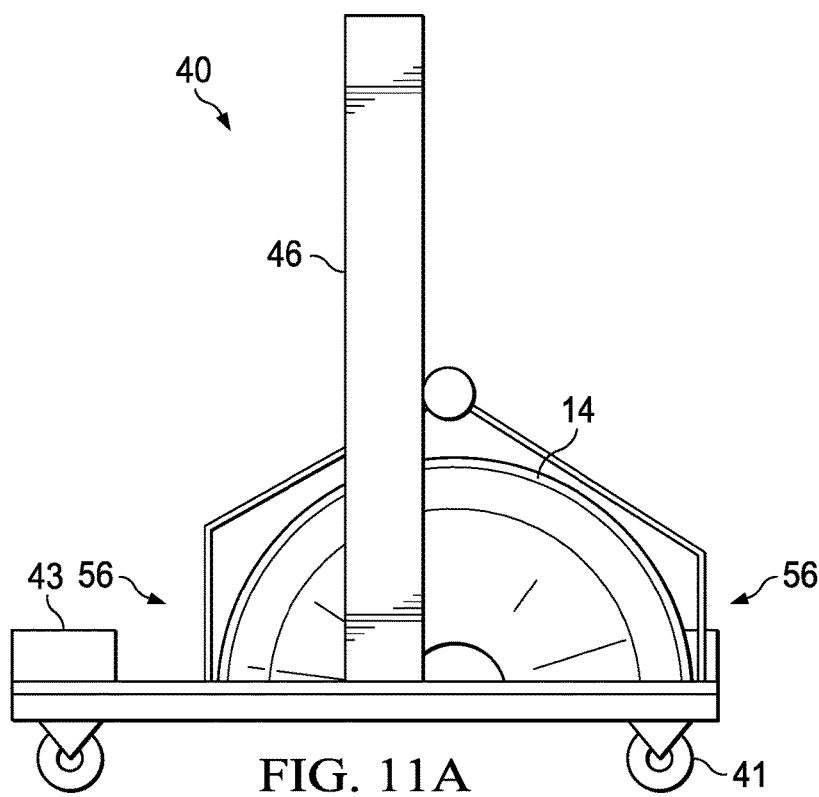
FIG. 11A semi-schematically depicts the moving system of FIG. 4 in alignment with a vehicle component, and attached to the vehicle component via a truss assembly.

By application of appropriate first, second, and optionally third electronic signals, vehicle component 14 can be lifted and/or lowered along first 44 and second 46 upright supports, pivoted about axes 64 and 86 relative to the upright supports, moved laterally with respect to second upright support 46, and rotated relative to outer support beam 62, in order to be accurately positioned in a desired position and orientation with respect to vehicle 6. For example and as shown in FIG. 11A, system 40 is shown in combination with vehicle component 14, where system 40 is positioned so that vehicle component 14 is disposed within component bay region 48 of base 42 of system 40. In this position, operation of first lift mechanism 66, second lift mechanism 82, rotational drive mechanism 68, first crossbeam support assembly 58, and second crossbeam support assembly 60 so that truss assembly 56 is positioned appropriately for attachment of truss assembly 56 to vehicle component 14.

Figure 11B:
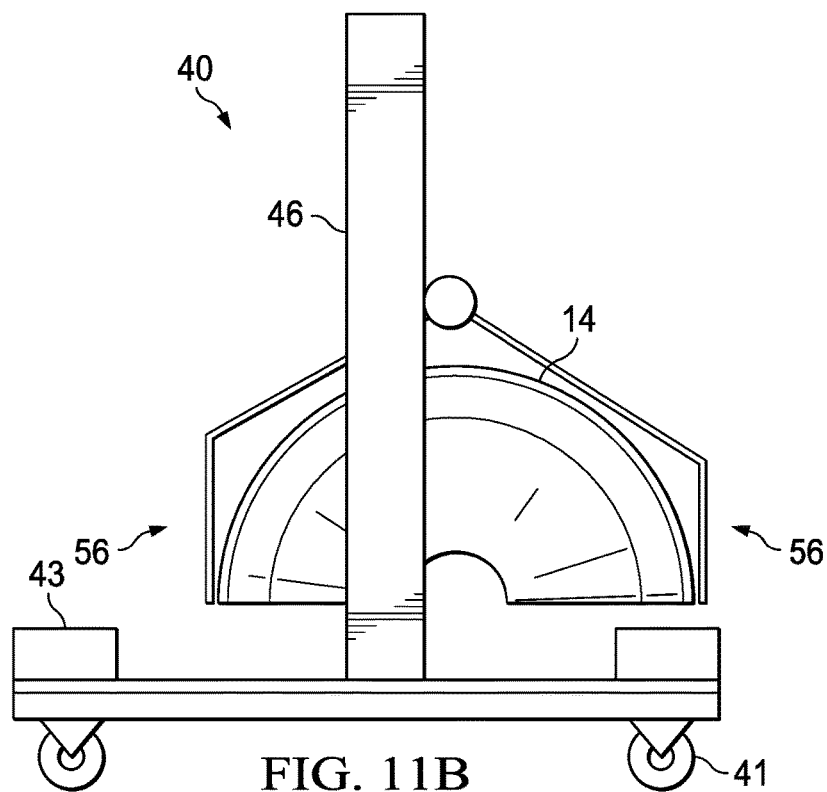
FIG. 11B depicts the moving system raising the vehicle component.
Figure 11C:
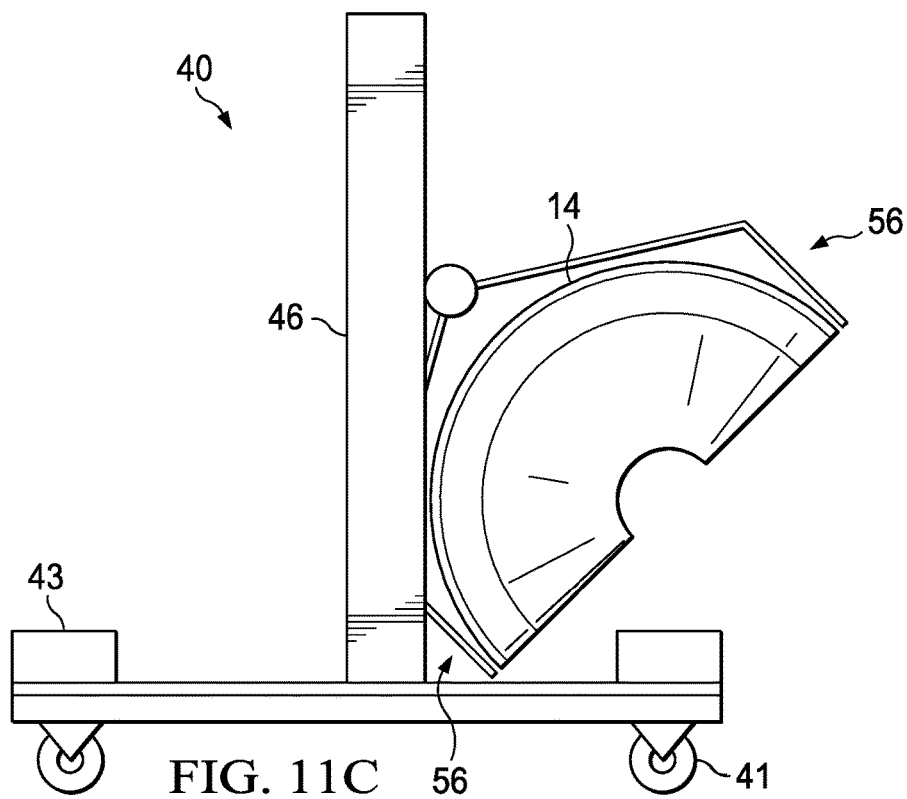
FIG. 11C depicts the moving system as it brings the vehicle component to the appropriate height and orientation for installation.
Figure 11D:
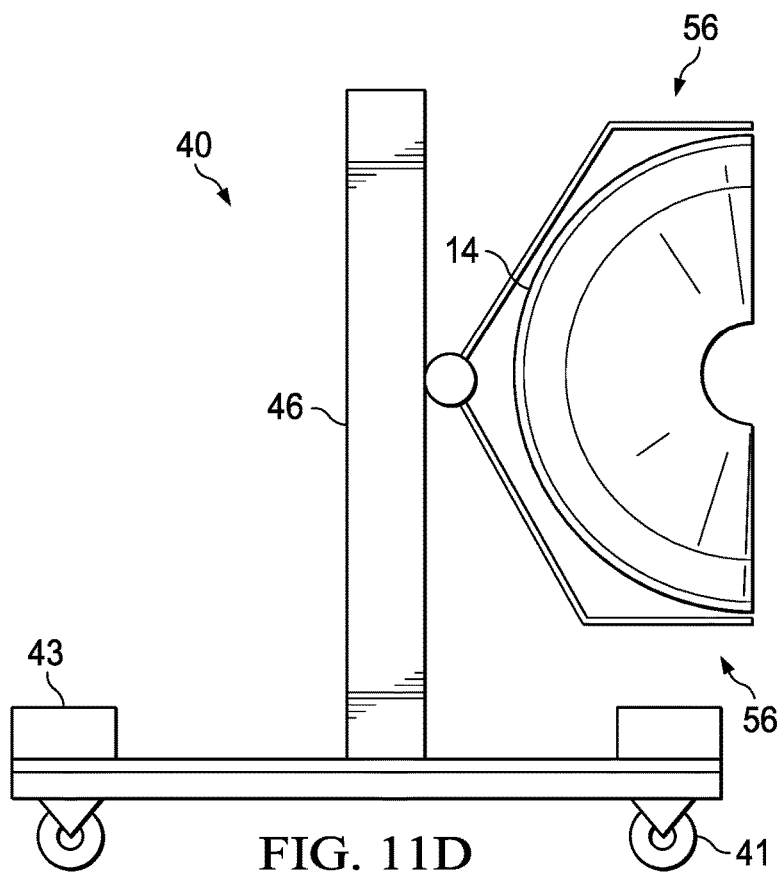
FIG. 11D semi-schematically depicts the moving system as it aligns with the engine strut and moves the vehicle component into position for installation.

After vehicle component 14 is fixed to truss assembly 56, first lift mechanism 66 and second lift mechanism 82 are operated to raise vehicle component 14 sufficiently to permit free movement of system 40, as shown in FIG. 11B. As shown in FIG. 11C, rotational drive mechanism 68 can be employed to rotate vehicle component 14 around beam axis 54 into an appropriate orientation for attachment to vehicle 6. Finally, as shown in FIG. 11D, movement of base 42 of system 40, coupled with any additional adjustments by one or more of first lift mechanism 66, second lift mechanism 82, rotational drive mechanism 68, first crossbeam support assembly 58, and second crossbeam support assembly 60 can be used to substantially align vehicle component 14 for coupling to vehicle 6.

Positioning Systems

Figure 12:
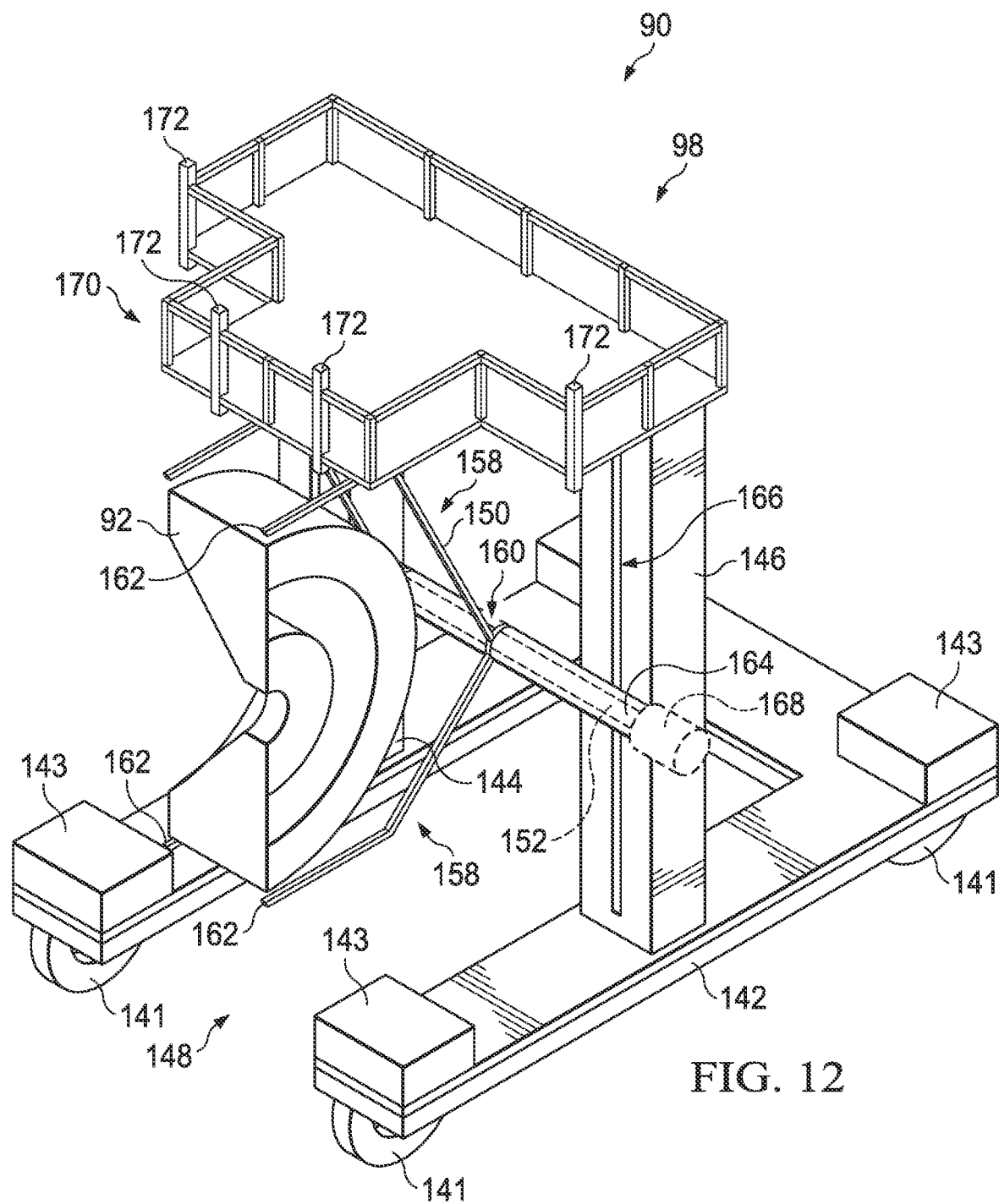
FIG. 12 semi-schematically depicts an illustrative positioning system for positioning an engine component of an aircraft according to the present disclosure.

In one aspect of the present disclosure, system 40 for moving a vehicle component may exhibit particular utility as a component of a positioning system 90 for positioning an engine component 92 for attachment to an engine 94 of an aircraft 96, an example of which is shown in FIG. 12.

Positioning system 90 may include a work platform 98 that permits mechanics or other service personnel to be near to the point of attachment of the engine component 92 to aircraft 96, without requiring any worker to balance atop an aircraft structure, or stand beneath a suspended load.

Positioning system 90 may include some or all of the components for moving engine component 92 similar to those recited above for moving system 40. Specifically, positioning system 90 may include a base 142, equipped with a plurality of wheels 141, so that base 142 is movable. Base 142 may be further equipped with one or more base-drive mechanisms 143 to supply power to wheels 141, and in one embodiment of positioning system 90 each wheel 141 may have a dedicated base-drive mechanism 143 to supply power to that wheel, so that base 42 may be moved in any direction as desired on work surface 24.

Base 142 of positioning system 90 may include spaced-apart first 144 and second 146 upright supports mounted to base 142 so as to be on opposite sides of a component bay region 148 of base 142.

Positioning system 90 may further include a lift frame 150 including a frame crossbeam 152 and a truss assembly 156 that includes a pair of cambered trusses 158 having respective apexes 160. Trusses 158 may be secured at apexes 160 at spaced-apart positions to frame crossbeam 152. Trusses 158 may further include distal ends 162 that may be configured to be secured at spaced-apart positions to the engine component 92, when secured by positioning system 90.

Positioning system 90 may further include a crossbeam support 164 on which frame crossbeam 152 may be supported for rotation relative to crossbeam support 164, where crossbeam support 164 is supported by, and configured for relative movement along, the pair of upright supports 144 and 146. In one aspect of the present disclosure, crossbeam support 164 is configured to span between the pair of upright supports 144 and 146.

Positioning system 90 may include a lift mechanism 166 configured to move crossbeam support 164 along at least one of upright supports 144 and 146. Positioning system 90 may additionally include a rotational drive 168 configured to rotate frame crossbeam 152 relative to crossbeam support 164, as described for moving system 40.

By virtue of these components positioning system 90 is configured to move engine component 92 so as to place engine component 92 in an appropriate position where it may be attached to an engine 94 of an aircraft 96. Additionally, positioning system 90 may include an alignment assembly 170 for determining how positioning system 90 should move in order to guide engine component 92 into that appropriate position.

Figure 13:
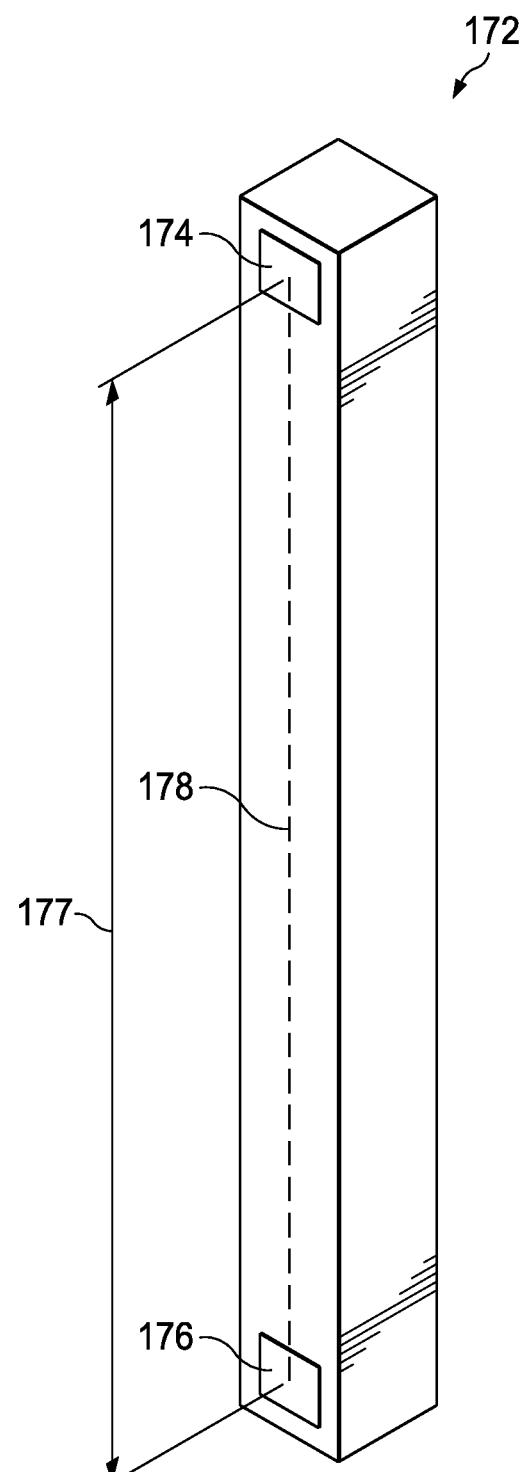
FIG. 13 semi-schematically depicts a laser assembly of the system of FIG. 12.

Alignment assembly 170 may include one or more laser assemblies 172, as shown in FIG. 13. Laser assembly 172 may be configured to support a first laser 174 and a second laser 176 so that they are disposed a known distance 177 apart along a reference line 178. Laser assembly 172 may be configured to be positioned relative to engine component 92 with reference line 178 oriented vertically, and with first 174 and second 176 lasers being individually adjustable in a plane 180 that includes reference line 178 so as to align a laser beam of each of first 174 and second 176 lasers, respectively, with a target position 182 on aircraft 96 associated with aircraft engine 94. Laser assembly 172 may be configured to provide a first indication representative of a first angle 184 of first laser beam 185 of first laser 174 relative to reference line 178 and a second indication representative of a second angle 186 of the second laser beam 187 of the second laser 176 relative to reference line 178.

The one or more laser assemblies 172 may be attached to work platform 98, as shown in FIG. 12, which depicts four laser assemblies 172 in association with work platform 98 of positioning system 90. The laser assemblies 172 of FIG. 12 are depicted in a retracted configuration B in order to protect the laser assemblies from collisions and incidental damage while securing and/or hoisting vehicle component 92.

Figure 14:
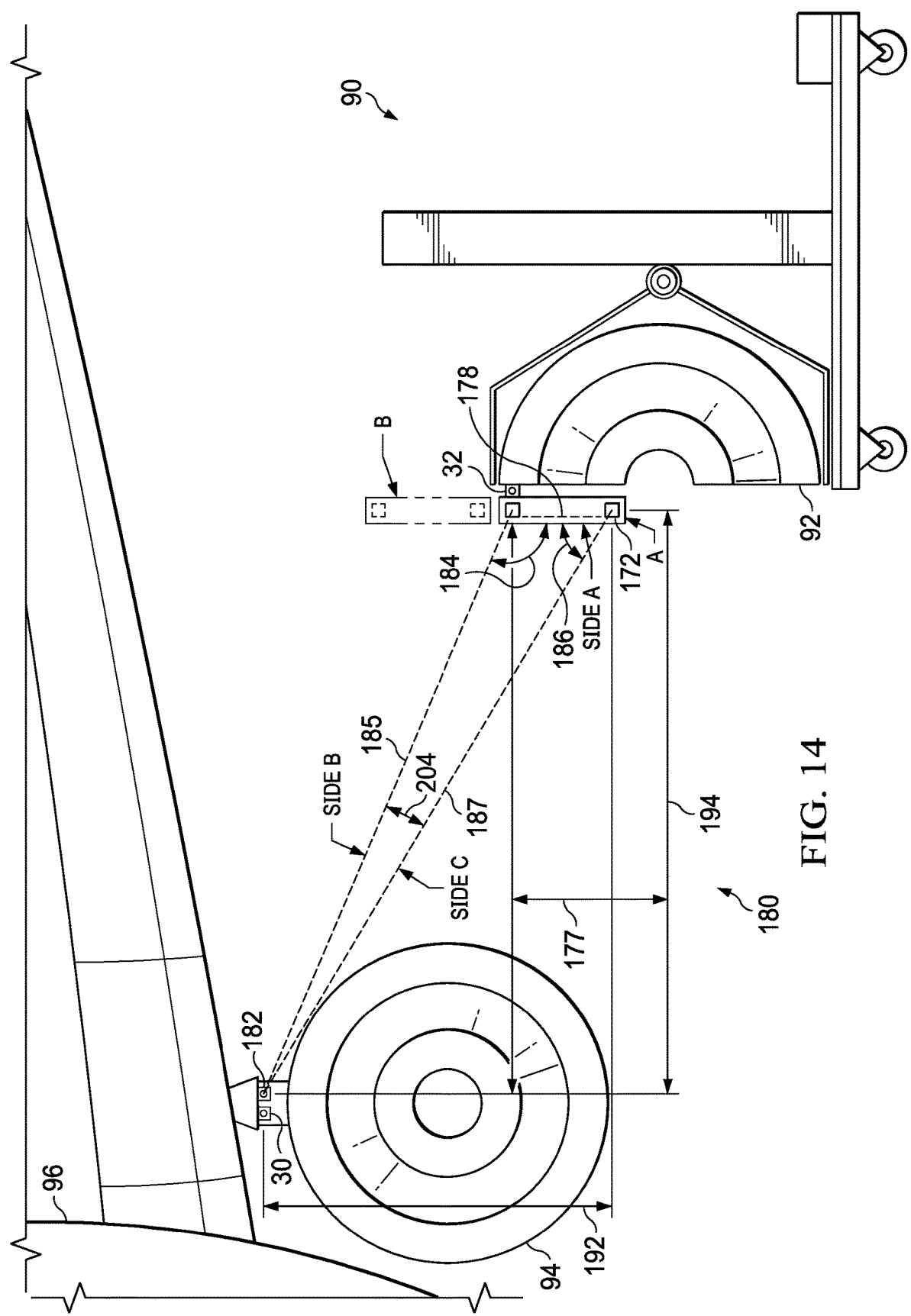
FIG. 14 depicts the use of the laser assembly of FIG. 13 to determine the position of an engine component relative to a target position.

Analogously to electronic system controller 80 for system 40 for moving a vehicle component, alignment assembly 170 for positioning system 90 may further include a system controller 190 that may be configured to control the operation of rotational drive 168 in order to rotate frame crossbeam 152 relative to crossbeam support 164 to rotationally position engine component 92 as it is secured to lift frame 150. System controller 190 may additionally be configured to determine a vertical distance 192 between engine component 92 and target position 182 on aircraft 96, as shown in FIG. 14, based at least in part on the first and second angles and the known distance. System controller 190 may be further configured to control operation of lift mechanism 166 so as to move crossbeam support 164 along at least one of upright supports 144 and 146 of positioning system 90 in a direction that reduces the vertical distance between engine component 92 and engine 94.

Again as similar to moving system 40, base drive mechanisms 143 may be coupled to system controller 190, so that system controller 190 could employ base-drive mechanisms 143 to move base 142 along a work surface 24. System controller 190 may be further configured to determine a horizontal distance 194 between engine component 92 and target position 182 on aircraft 96 based at least in part on the first and second angles and the known distance. System controller 190 may be further configured to control operation of base-drive mechanisms 143 so as to move base 142 along work surface 24 in a direction that reduces the horizontal distance between engine component 92 and engine 94.

Target position 182 on aircraft 96 may be a location for attachment of engine component 92. For example, where engine component 92 mounts to aircraft 96 with a hinge assembly 28 that includes a first hinge component 30 on aircraft 96 and a second hinge component 32 on engine component 92, target position 182 on aircraft 96 may be the position of first hinge component 30. In this aspect of the disclosure, laser assembly 172 may be configured to be positioned relative to engine component 92 with first laser 174 positioned proximate to second hinge component 32, with reference line 178 oriented vertically, and with first 174 and second 176 lasers being disposed in a reference plane 180 (coincident with the plane of FIG. 14) that includes reference line 178 so as to align a laser beam of each of first 174 and second 176 lasers, respectively, with hinge component 30 on aircraft 96.

In one aspect of the present disclosure, laser assembly 172 of positioning system 90 is configured to support the first 174 and second 176 lasers in a deployed configuration A, as shown in FIG. 14, such that first laser 174 may be positioned proximate to second hinge component 32 of hinge assembly 28, as such a proximate position aids in the accuracy of system controller 190 in positioning engine component 92. However, laser assembly 172 may also be configured to support the first 174 and second 176 lasers in a retracted configuration B, also shown in FIG. 14 such that the first 174 and second 176 lasers are spaced away from engine component 92, so as to protect the first 174 and second 176 lasers from collisions and consequent damage while positioning system 90 is being moved. System controller 190 may therefore be additionally configured to control operation of base-drive mechanisms 143 while the first 174 and second 176 lasers are in their retracted configuration, as shown for example in FIG. 12.

Position Calculation

System controller 190 may employ first 174 and second 176 lasers of laser assembly 172 to calculate a distance and bearing between a location on engine component 92, such as second hinge component 32, and a target position 182 on aircraft 96, such as first hinge component 30.

Laser assembly 172 may be deployed proximal to engine component 92, with one of the first 174 and second 176 lasers adjacent to second hinge component 32. As shown in the semi-schematic diagram of FIG. 14 showing laser assembly 172, including first 174 and second 176 lasers adjacent an engine component 92. When appropriately deployed, first and second lasers are disposed along reference line 178, and furthermore are disposed a known distance 177 apart, as shown in FIGS. 13 and 14. To determine the relative position of engine component 92 with respect to target position 182, the laser beams 185 and 198 emitted by first 174 and second 176 lasers, respectively, are each aligned with target position 182, as shown. In doing so, the reference line 178 (side a), first laser beam 185 (side b), and second laser beam 187 (side c) form a typically scalene or isosceles triangle having three sides, the vertices of which correspond to target position 182 and the first 174 and second 176 lasers.

First 174 and second 176 lasers may be configured so that as their respective laser beams 185 and 187 are aligned with target position 182, the elevation angle of each laser beam above a horizontal plane is determined by angle indicators 200 and 202, respectively. Using the elevation angles, angle 184 between first laser beam 185 and reference line 178, and angle 186 between second laser beam 187 and reference line 178 may be readily calculated. Once angles 184 and 186 are known, third angle 204 between first laser beam 185 and second laser beam 187 at target position 182 may be readily calculated.

As the distance 177 along reference line 178 (side a) between first 174 and second 176 lasers is also known, the length of sides b and c may be calculated using the Law of Sines:

$$\frac{\sin A}{a} = \frac{\sin B}{b} = \frac{\sin C}{c}$$

where A is angle 184, B is angle 186, C is angle 184, and a is the known distance 177 along reference line 178.

As a hypothetical and illustrative example, assume that upper laser 174 has been aimed at target position 182, and as a result upper laser beam 185 is elevated 27 degrees above the horizontal plane. Similarly, lower laser 176 is aimed at target position 182, and as a result lower laser beam 187 is elevated 38 degrees above the horizontal plane. Upper laser 174 and lower laser 176 are separated vertically by a distance of 36 inches (914 mm).

In this example, angle C is therefore 90 degrees+27 degrees, or 117 degrees. Similarly, angle B is 90 degrees−38 degrees, or 52 degrees. Angle A must therefore be 11 degrees (180−(117+52)). As each of angles A, B, and C is now known, and the length of side a is known, the law of sines may be applied to arrive at the length of sides b and c:

$$\frac{\sin 11}{36} = \frac{0.190809}{36} = \frac{\sin 52}{b} = \frac{\sin 117}{c}$$

By solving for the lengths of side b and side c, it can be determined that side b=149 inches (37.8 cm) and side c=168 inches (42.7 cm). Using trigonometry, the horizontal distance from upper laser 174 to target position 182 is calculated to be 132.8 inches (337.3 cm), and the distance from lower laser 176 to target position 182 is calculated to be 132.4 inches (336.3 cm), giving an average distance of 132.6 inches. Therefore engine component 92 needs to move 132.6 inches (336.8 cm) closer to target position 182.

A similar calculation provides a vertical distance between upper laser 174, which is adjacent to second hinge component 32, and the target position 182 of 67.6 inches (172 cm). As a confirmatory calculation, the vertical distance between lower laser 176 and target position 182 can be calculated to be 103.4 inches (263 cm). By subtracting fixed distance 177, or 36 inches (91 cm), the second hinge component 32 must be raised 103.4 inches−36 inches, or 67.4 inches (172 cm), essentially the same distance.

System controller 190 can therefore align second hinge component 32 of engine component 92 with the first hinge component 30 at target position 182 by controlling the operation of base-drive mechanism 143 so as to move engine component 92 a distance of 133 inches forward, and controlling lift mechanism 166 so as to raise engine component 92 a distance of 67 inches. The combined result of both the forward motion and the upward lift will dispose second hinge component 32 on engine component 92 in alignment with or adjacent to first hinge component 30 on aircraft 96.

Applications

Figure 15:
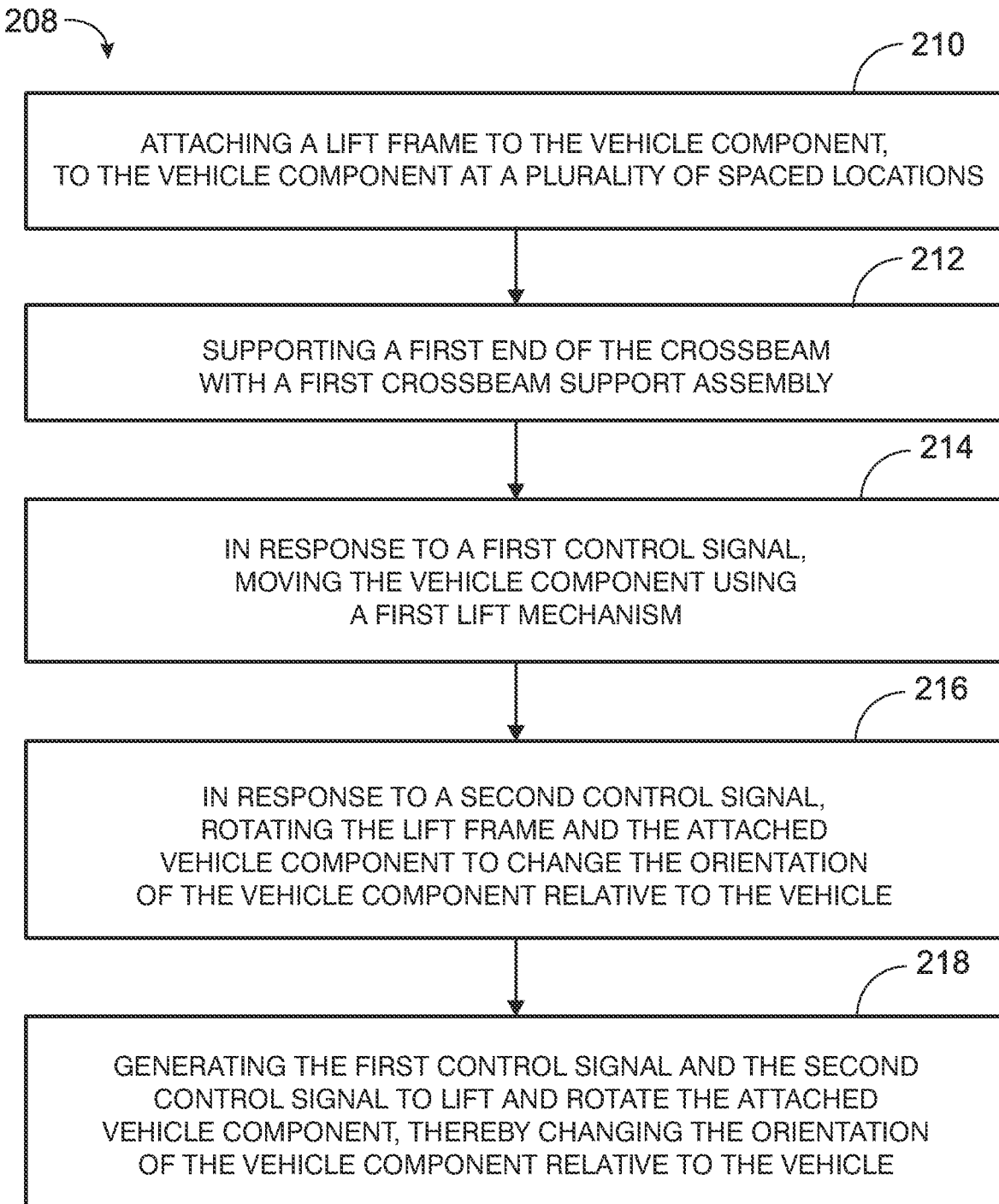
FIG. 15 is a flowchart depicting a method of moving a vehicle component of a vehicle relative to a structure of the vehicle during installation of the component on the structure, according to the present disclosure.

System 40 of the present disclosure may be particularly well-suited to carrying out a method of moving a vehicle component of a vehicle relative to a structure of the vehicle during installation of the component on the structure, as set out in flowchart 208 of FIG. 15. The method may include: attaching a lift frame to the vehicle component, where the lift frame includes a crossbeam and a pair of spaced-apart cambered truss assemblies attached to the crossbeam, and attaching the lift frame to the vehicle component includes securing the pair of truss assemblies to the vehicle component at a plurality of spaced locations, at step 210 of flowchart 208; supporting a first end of the crossbeam with a first crossbeam support assembly, at step 212 of flowchart 208; moving by a first lift mechanism in response to a first control signal the vehicle component by moving the first crossbeam support assembly along a first support mounted to and extending upwardly from a base supported on a work surface, at step 214 of flowchart 208; rotating by a rotational drive mechanism in response to a second control signal the lift frame and the attached vehicle component about a beam axis relative to the first crossbeam support assembly to change the orientation of the vehicle component relative to the vehicle, at step 216 of flowchart 208; and changing the orientation of the vehicle component relative to the vehicle by generating by an electronic controller the first control signal controlling operation of the first lift mechanism to move the first crossbeam support assembly along the first support, and the second control signal for controlling operation of the rotational drive mechanism to rotate the lift frame and the attached vehicle component relative to the first crossbeam support assembly, at step 218 of flowchart 208.

In one aspect of the present disclosure, the method of flowchart 208 may further include the steps of receiving by the electronic controller input information related to alignment of a first laser and second laser positioned proximate the vehicle component with respect to a target installation point on the vehicle structure, which input information is representative of an objective position and orientation of the vehicle component relative to the vehicle structure; generating by the electronic controller in response to the received input information the first control signal for controlling operation of the first lift mechanism to move the first crossbeam support assembly along the first support; and generating by the electronic controller in response to the received input information the second control signal for controlling operation of the rotational drive mechanism to rotate the crossbeam and the attached vehicle component relative to the first crossbeam support assembly.

In another aspect of the present disclosure, the method of flowchart 208 may further include the steps of receiving by the electronic controller input information associated with an objective position of the vehicle component; in response to the received input information, generating the first control signal for controlling operation of the first lift mechanism to move the first crossbeam support assembly along the first support; and generating the second control signal for controlling operation of the rotational drive mechanism to rotate the crossbeam relative to the first crossbeam support assembly to rotationally position the vehicle component when supported by the lift frame.

In one aspect of the present disclosure, moving the first crossbeam support assembly along a first support mounted to and extending upwardly from a base supported on a work surface, at step 214 of flowchart 208, additionally includes pivoting the crossbeam relative to the first support about a first pivot axis that is transverse to the beam axis. Pivoting the crossbeam relative to the first support may include supporting the crossbeam by a first crossbeam support element, supporting a first support member by the first lift mechanism for movement along a first lift line along the first support, and pivoting the first crossbeam support element about a pivot pin pivotingly coupling the first crossbeam support element to the first support member. The method may further include moving the second crossbeam support element relative to the second support member along a lateral line transverse to the second lift line.

The method of flowchart 208 may further include the step of moving the crossbeam laterally of the second support.

The method of flowchart 208 may additionally include the steps of supporting a second end of the crossbeam with a second crossbeam support assembly movable along a second support mounted to and extending upwardly from the base; moving the second crossbeam support assembly along the second support by a second lift mechanism in response to a third control signal; and generating by the electronic controller the third control signal controlling operation of the second lift mechanism to move the second crossbeam support assembly along the second support, to thereby change the position of the vehicle component relative to the vehicle.

Figure 16:
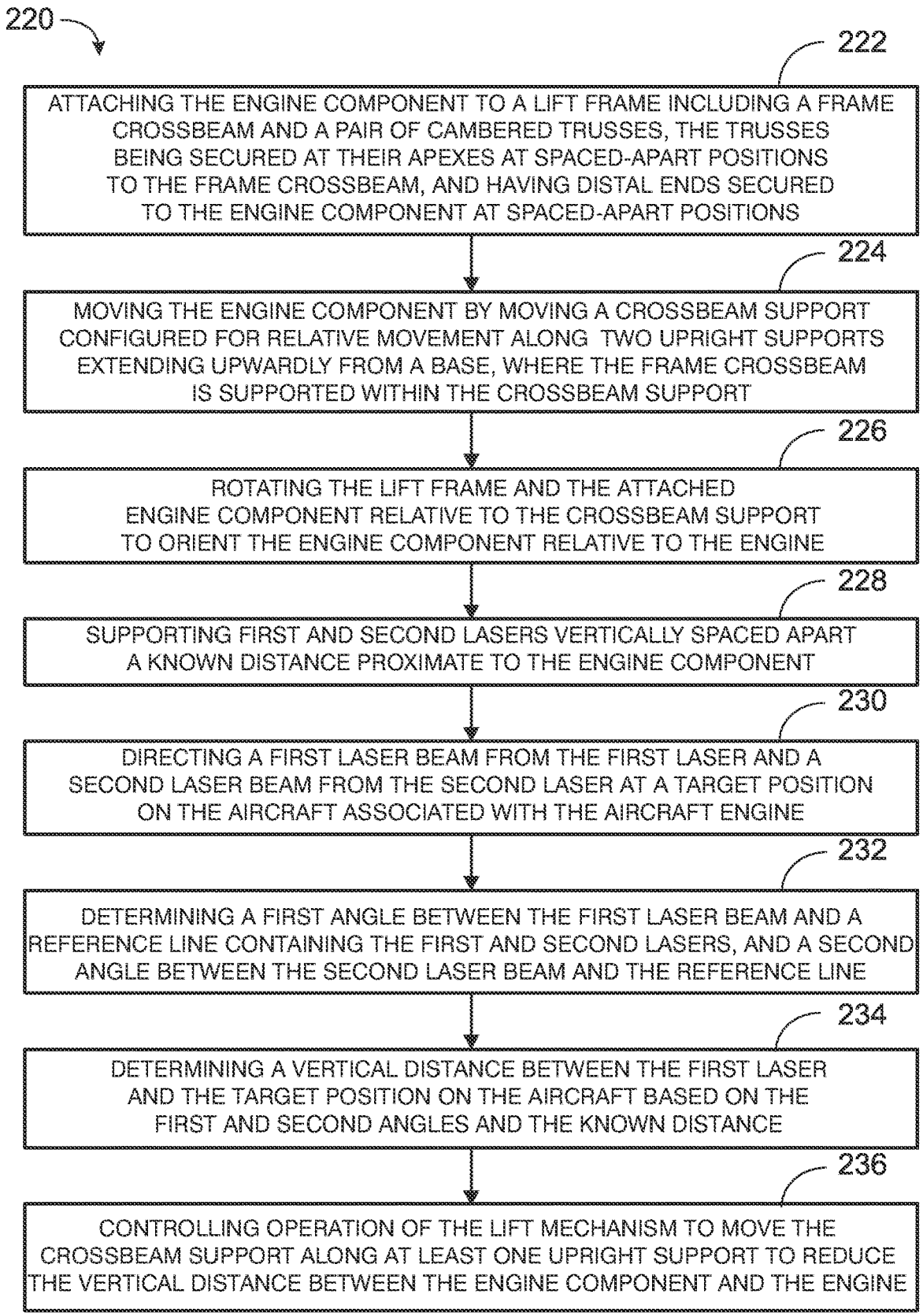
FIG. 16 is a flowchart depicting a method of positioning an engine component for attachment to an engine of an aircraft, according to the present disclosure.

Positioning system 90 may be particularly well-suited to carrying out a method of positioning an engine component for attachment to an engine of an aircraft, as set out in flowchart 220 of FIG. 16. Such a method may include attaching the engine component to a lift frame including a frame crossbeam and a pair of cambered trusses having respective apexes, the trusses being secured at their apexes at spaced-apart positions to the frame crossbeam, and having distal ends secured at spaced-apart positions to the engine component, at step 222 of flowchart 220; moving by a lift mechanism the engine component by moving a crossbeam support within which the frame crossbeam is supported, the crossbeam support configured for relative movement along two upright supports extending upwardly from a base at step 224 of flowchart 220; rotating by a rotational drive the lift frame and the attached engine component relative to the crossbeam support to orient the engine component relative to the engine at step 226 of flowchart 220; supporting first and second lasers vertically spaced apart a known distance proximate to the engine component at step 228 of flowchart 220; directing a first laser beam emitted by the first laser and a second laser beam emitted by the second laser at a target position on the aircraft associated with the aircraft engine, at step 230 of flowchart 220; determining a first angle of the first laser beam relative to a reference line containing the first and second lasers, and a second angle of the second laser beam relative to the reference line, at step 232 of flowchart 220; determining, by an electronic system controller having a processor, a vertical distance between the first laser and the target position on the aircraft based at least in part on the first and second angles and the known distance, at step 234 of flowchart 220; and controlling operation of the lift mechanism to move the crossbeam support along the at least one upright support in a direction that reduces the vertical distance between the engine component and the engine, at step 236 of flowchart 220.

In one aspect of the present disclosure, the method of flowchart 220 may further include determining by the system controller a horizontal distance between the engine component and the target position on the aircraft based at least in part on the first and second angles and the known distance; and controlling operation of a base-drive mechanism coupled to the system controller and configured to move the base along a work surface, in a manner moving the base along the work surface in a direction that reduces the horizontal distance between the engine component and the engine. The method of flowchart 220 may further include moving the first and second lasers away from the engine component after determining the first angle of the first laser beam and the second angle of the second laser beam and before controlling operation of the base-drive mechanism to move the crossbeam support along the work surface.

At step 228 of the method of flowchart 220, supporting the first and second lasers proximate to the engine component may additionally include positioning the first laser proximate to a first hinge component of a hinge used to mount the engine component to the aircraft with the hinge including the first hinge component on the engine component and a second hinge component on the aircraft, and the target position on the aircraft is a position of the second hinge component. The method may additionally include aligning the first hinge component to the second hinge component and securing the first hinge component to the second hinge component, and subsequently moving the first and second lasers away from the engine component after determining the first angle of the first laser beam and the second angle of the second laser beam and before controlling operation of the lift mechanism to move the crossbeam support along the at least one upright support in a direction that reduces the vertical distance between the engine component and the engine. In performing the disclosed method, the system controller may be configured to control operation of the base-drive mechanism after the first and second lasers have been moved away from the engine component.

EXAMPLES, COMPONENTS, AND ALTERNATIVES

The following sections describe selected aspects of exemplary moving systems and positioning systems, according to the present disclosure, as well as related methods. The examples in these sections are intended for illustration and should not be interpreted as limiting the entire scope of the present disclosure. Each section may include one or more distinct inventions, and/or contextual or related information, function, and/or structure.

Example 1: Illustrative Data Processing System

Figure 17:
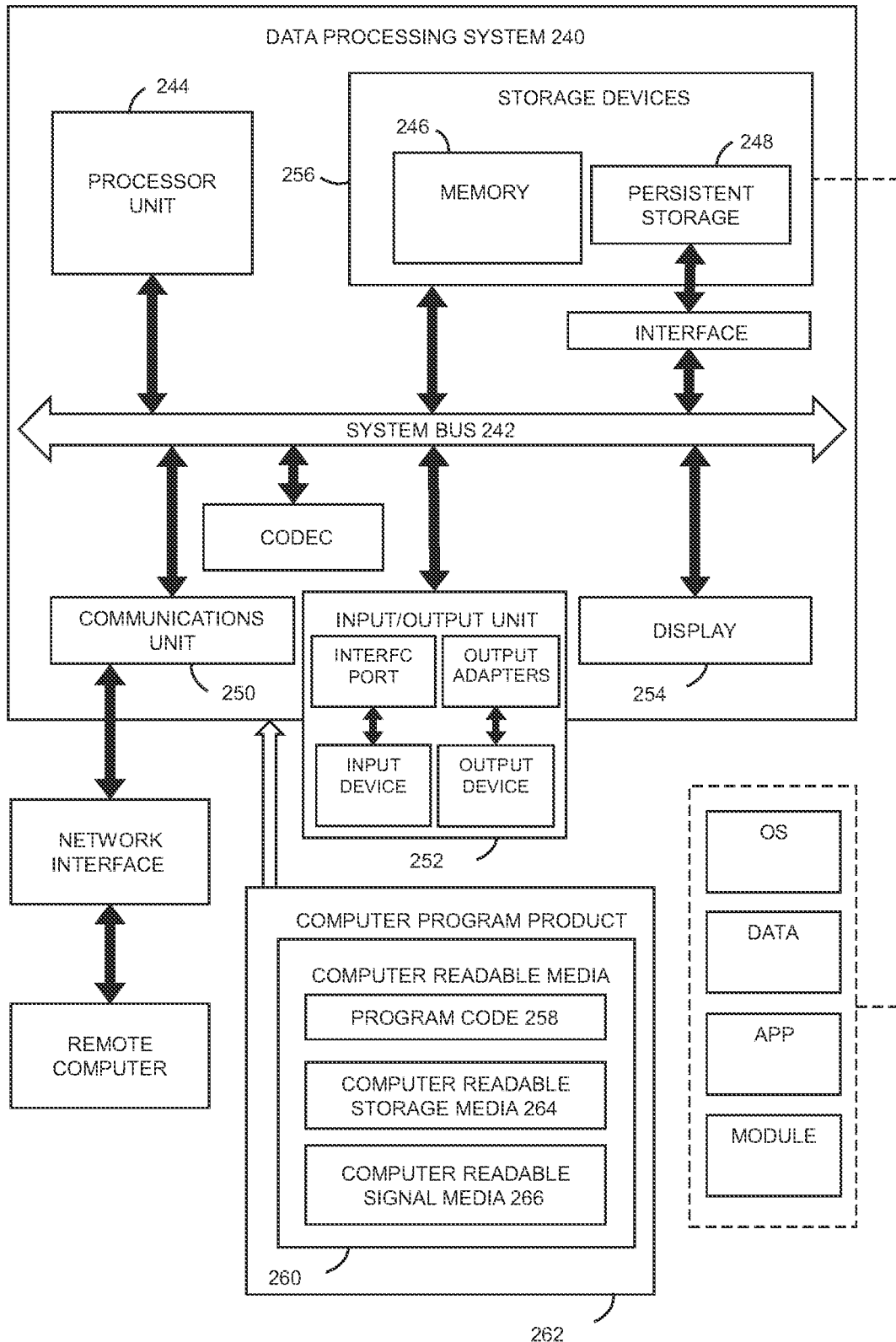
FIG. 17 is a schematic diagram of a representative data processing, in accordance with selected aspects of the present disclosure.

As shown in FIG. 17, this example describes a data processing system 240 (also referred to as a computer) in accordance with aspects of the present disclosure. In this example, data processing system 240 is an illustrative data processing system suitable for implementing aspects of the moving systems and positioning systems of the present disclosure. More specifically and as discussed above, in some examples the moving systems and positioning systems may include a system controller (80, 190) that may be or that may include one or more data processing systems. In performing the functions described above, such as controlling the movement and positioning of a vehicle component and/or calculating the relative positioning of an engine component with respect to a target point, system controller 80, 190 may exhibit some or all of the characteristics of data processing system 240 as shown and as described below.

In this illustrative example, data processing system 240 includes communications framework 242. Communications framework 242 provides communications between processor unit 244, memory 246, persistent storage 248, communications unit 250, input/output (I/O) unit 252, and display 254. Memory 246, persistent storage 248, communications unit 250, input/output (I/O) unit 252, and display 254 are examples of resources accessible by processor unit 244 via communications framework 242.

Processor unit 244 serves to run instructions that may be loaded into memory 246. Processor unit 244 may be a number of processors, a multi-processor core, or some other type of processor, depending on the particular implementation. Further, processor unit 244 may be implemented using a number of heterogeneous processor systems in which a main processor is present with secondary processors on a single chip. As another illustrative example, processor unit 244 may be a symmetric multi-processor system containing multiple processors of the same type.

Memory 246 and persistent storage 248 are examples of storage devices 256. A storage device is any piece of hardware that is capable of storing information, such as, for example, without limitation, data, program code in functional form, and other suitable information either on a temporary basis or a permanent basis.

Storage devices 256 also may be referred to as computer-readable storage devices in these examples. Memory 246, in these examples, may be, for example, a random access memory or any other suitable volatile or non-volatile storage device. Persistent storage 248 may take various forms, depending on the particular implementation.

For example, persistent storage 248 may contain one or more components or devices. For example, persistent storage 248 may be a hard drive, a flash memory, a rewritable optical disk, a rewritable magnetic tape, or some combination of the above. The media used by persistent storage 248 also may be removable. For example, a removable hard drive may be used for persistent storage 248.

Communications unit 250, in these examples, provides for communications with other data processing systems or devices. In these examples, communications unit 250 is a network interface card. Communications unit 250 may provide communications through the use of either or both physical and wireless communications links.

Input/output (I/O) unit 252 allows for input and output of data with other devices that may be connected to data processing system 240. For example, input/output (I/O) unit 252 may provide a connection for user input through a keyboard, a mouse, and/or some other suitable input device. Further, input/output (I/O) unit 252 may send output to a printer. Display 254 provides a mechanism to display information to a user.

Instructions for the operating system, applications, and/or programs may be located in storage devices 256, which are in communication with processor unit 244 through communications framework 242. In these illustrative examples, the instructions are in a functional form on persistent storage 248. These instructions may be loaded into memory 246 for execution by processor unit 244. The processes of the different embodiments may be performed by processor unit 244 using computer-implemented instructions, which may be located in a memory, such as memory 246.

These instructions are referred to as program instructions, program code, computer usable program code, or computer-readable program code that may be read and executed by a processor in processor unit 244. The program code in the different embodiments may be embodied on different physical or computer-readable storage media, such as memory 246 or persistent storage 248.

Program code 258 is located in a functional form on computer-readable media 260 that is selectively removable and may be loaded onto or transferred to data processing system 240 for execution by processor unit 244. Program code 258 and computer-readable media 260 form computer program product 262 in these examples. In one example, computer-readable media 260 may be computer-readable storage media 264 or computer-readable signal media 266.

Computer-readable storage media 264 may include, for example, an optical or magnetic disk that is inserted or placed into a drive or other device that is part of persistent storage 248 for transfer onto a storage device, such as a hard drive, that is part of persistent storage 248. Computer-readable storage media 264 also may take the form of a persistent storage, such as a hard drive, a thumb drive, or a flash memory, that is connected to data processing system 240. In some instances, computer-readable storage media 264 may not be removable from data processing system 240.

In these examples, computer-readable storage media 264 is a physical or tangible storage device used to store program code 258 rather than a medium that propagates or transmits program code 258. Computer-readable storage media 264 is also referred to as a computer-readable tangible storage device or a computer-readable physical storage device. In other words, computer-readable storage media 264 is a media that can be touched by a person.

Alternatively, program code 258 may be transferred to data processing system 240 using computer-readable signal media 266. Computer-readable signal media 266 may be, for example, a propagated data signal containing program code 258. For example, computer-readable signal media 266 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 258 may be downloaded over a network to persistent storage 248 from another device or data processing system through computer-readable signal media 266 for use within data processing system 240. For instance, program code stored in a computer-readable storage medium in a server data processing system may be downloaded over a network from the server to data processing system 240. The data processing system providing program code 258 may be a server computer, a client computer, or some other device capable of storing and transmitting program code 258.

The different components illustrated for data processing system 240 are not meant to provide architectural limitations to the manner in which different embodiments may be implemented. The different illustrative embodiments may be implemented in a data processing system including components in addition to and/or in place of those illustrated for data processing system 240. Other components shown in FIG. 17 can be varied from the illustrative examples shown. The different embodiments may be implemented using any hardware device or system capable of running program code. As one example, data processing system 240 may include organic components integrated with inorganic components and/or may be comprised entirely of organic components excluding a human being. For example, a storage device may be comprised of an organic semiconductor.

In another illustrative example, processor unit 244 may take the form of a hardware unit that has circuits that are manufactured or configured for a particular use. This type of hardware may perform operations without needing program code to be loaded into a memory from a storage device to be configured to perform the operations.

For example, when processor unit 244 takes the form of a hardware unit, processor unit 244 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 258 may be omitted, because the processes for the different embodiments are implemented in a hardware unit.

In still another illustrative example, processor unit 244 may be implemented using a combination of processors found in computers and hardware units. Processor unit 244 may have a number of hardware units and a number of processors that are configured to run program code 258. With this depicted example, some of the processes may be implemented in the number of hardware units, while other processes may be implemented in the number of processors.

In another example, a bus system may be used to implement communications framework 242 and may be comprised of one or more buses, such as a system bus or an input/output bus. Of course, the bus system may be implemented using any suitable type of architecture that provides for a transfer of data between different components or devices attached to the bus system.

Additionally, communications unit 250 may include a number of devices that transmit data, receive data, or both transmit and receive data. Communications unit 250 may be, for example, a modem or a network adapter, two network adapters, or some combination thereof. Further, a memory may be, for example, memory 246, or a cache, such as that found in an interface and memory controller hub that may be present in communications framework 242.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 2: Illustrative Distributed Data Processing System

Figure 18:
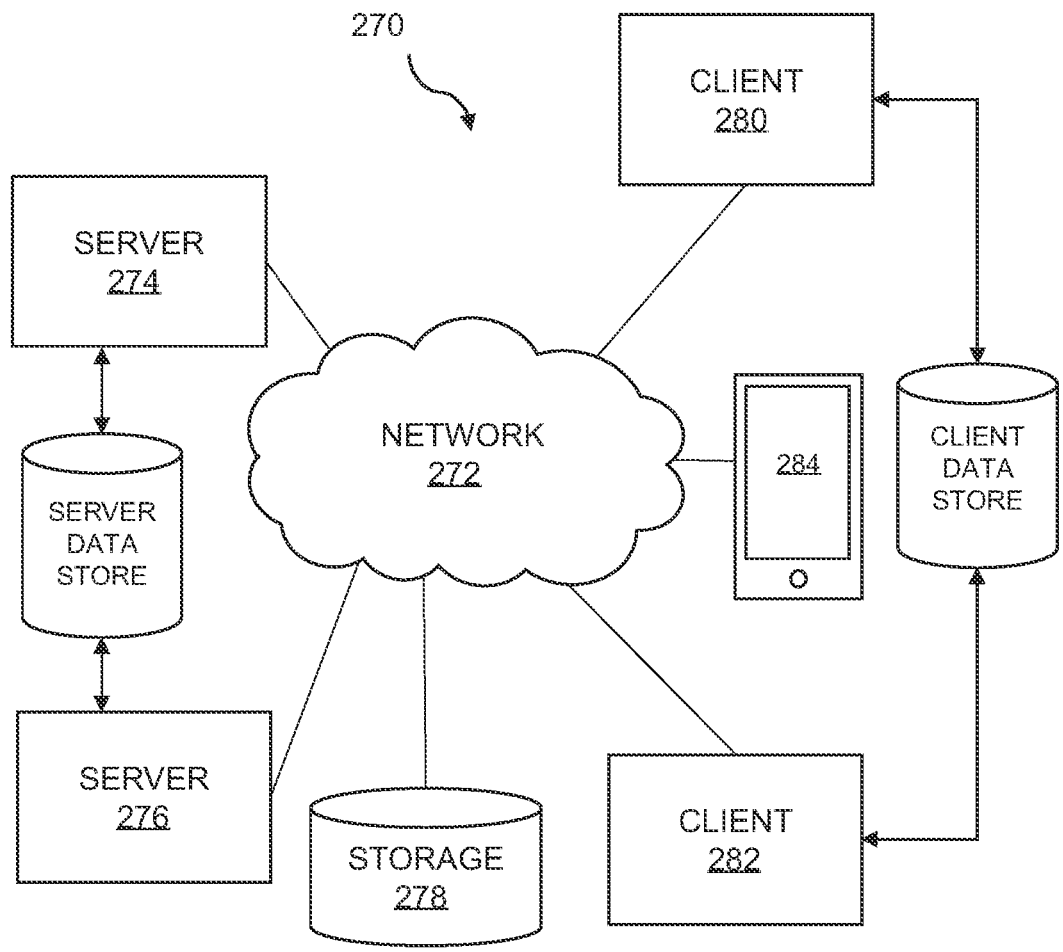
FIG. 18 is a schematic diagram of a representative general network data processing system.

This example describes a general network data processing system 270, as shown in FIG. 18. Network data processing system 270 may be interchangeably termed a network, a computer network, a network system, a distributed data processing system, or a distributed network, aspects of which may be included in one or more illustrative embodiments of the moving systems and positioning systems of the present disclosure. For example, system controller 80, 190 of the disclosed systems may communicate over a network in order to coordinate with other equipment being used in a manufacturing facility, or to access processing centers remote from the system controller itself, among other applications. It should be appreciated that FIG. 18 is provided as an illustration of one implementation and is not intended to imply any limitation with regard to environments in which different embodiments may be implemented. Many modifications to the depicted environment may be made.

Network data processing system 270 is a network of computers, each of which is an example of data processing system 240, and other components. Network data processing system 270 may include network 272, which is a medium configured to provide communications links between various devices and computers connected together within network data processing system 270. Network 272 may include connections such as wired or wireless communication links, fiber optic cables, and/or any other suitable medium for transmitting and/or communicating data between network devices, or any combination thereof.

In the depicted example, a first network device 274 and a second network device 276 connect to network 272, as does an electronic storage device 278. Network devices 274 and 276 are each examples of data processing system 240, described above. In the depicted example, devices 274 and 276 are shown as server computers. However, network devices may include, without limitation, one or more personal computers, mobile computing devices such as personal digital assistants (PDAs), tablets, and smart phones, handheld gaming devices, wearable devices, tablet computers, routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices, such as a client computer 280, a client laptop or tablet 282 and/or a client smart device 284, may connect to network 272. Each of these devices is an example of data processing system 240, described above regarding FIG. 17. Client electronic devices 280, 282, and 284 may include, for example, one or more personal computers, network computers, and/or mobile computing devices such as personal digital assistants (PDAs), smart phones, handheld gaming devices, wearable devices, and/or tablet computers, and the like. In the depicted example, server 274 provides information, such as boot files, operating system images, and applications to one or more of client electronic devices 280, 282, and 284. Client electronic devices 280, 282, and 284 may be referred to as "clients" with respect to a server such as server computer 274. Network data processing system 270 may include more or fewer servers and clients or no servers or clients, as well as other devices not shown.

Client smart device 284 may include any suitable portable electronic device capable of wireless communications and execution of software, such as a smartphone or a tablet. Generally speaking, the term "smartphone" may describe any suitable portable electronic device having more advanced computing ability and network connectivity than a typical mobile phone. In addition to making phone calls (e.g., over a cellular network), smartphones may be capable of sending and receiving emails, texts, and multimedia messages, accessing the Internet, and/or functioning as a web browser. Smart devices (e.g., smartphones) may also include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and other devices to form a mobile network where information can be exchanged.

Program code located in system 270 may be stored in or on a computer recordable storage medium, such as persistent storage 248 described above, and may be downloaded to a data processing system or other device for use. For example, program code may be stored on a computer recordable storage medium on server computer 274 and downloaded for use to client 280 over network 272 for use on client 280.

Network data processing system 270 may be implemented as one or more of a number of different types of networks. For example, system 270 may include an intranet, a local area network (LAN), a wide area network (WAN), or a personal area network (PAN). In some examples, network data processing system 270 includes the Internet, with network 272 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 270 may be referred to as a "cloud." In those examples, each server 274 may be referred to as a cloud computing node, and client electronic devices may be referred to as cloud consumers, or the like. FIG. 18 is intended as an example, and not as an architectural limitation for any illustrative embodiments.

Example 3: Representative Aspects and Features

This section describes additional aspects and features of the moving systems and positioning systems of the present disclosure, including their use, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A system for moving a vehicle component of a vehicle relative to a structure of the vehicle during installation of the component on the structure, the system comprising:

spaced-apart first and second supports mounted to a base on opposite sides of a component bay region of the base, the first and second supports extending upwardly from the base;

a lift frame including a crossbeam extending between the first and second supports along a beam axis, and a pair of spaced-apart cambered truss assemblies secured to the crossbeam and configured to be attached to and support the vehicle component relative to the crossbeam;

first and second crossbeam support assemblies on the first and second supports, configured to support the crossbeam for rotation of the crossbeam relative to the first and second supports, the first and second crossbeam support assemblies being movable along the first and second supports;

a first lift mechanism configured to move the first crossbeam support assembly along the first support in response to a first control signal;

a rotational drive mechanism configured to rotate the crossbeam about the beam axis relative to the first and second crossbeam support assemblies in response to a second control signal; and an electronic controller operatively coupled to the first lift mechanism and the rotational drive mechanism, configured to generate the first control signal controlling operation of the first lift mechanism to move the first crossbeam support assembly along the first support, and to generate the second control signal controlling operation of the rotational drive mechanism to rotate the crossbeam relative to the first crossbeam support assembly, to thereby change the position of the vehicle component relative to the vehicle.

A2. The system of paragraph A1, wherein the electronic controller is configured to receive input information associated with an objective position of the vehicle component, and in response to the received input information to generate the first control signal for controlling operation of the first lift mechanism to move the first crossbeam support assembly along the first support, and generate the second control signal for controlling operation of the rotational drive mechanism to rotate the crossbeam relative to the first crossbeam support assembly to rotationally position the vehicle component when supported by the lift frame.

A3. The system of paragraph A1, wherein the first and second crossbeam support assemblies include a tubular outer support beam extending between the first and second supports, with the support beam enclosing the crossbeam.

A4. The system of paragraph A1, wherein the first support, the first crossbeam support assembly, and the crossbeam are collectively configured to allow the crossbeam to pivot about a first pivot axis that is transverse to the beam axis.

A5. The system of paragraph A4, wherein the first crossbeam support assembly includes a first crossbeam support element supporting the crossbeam, a first support member supported by the first lift mechanism for movement along a first lift line along the first support, and a pivot pin pivotingly coupling the first crossbeam support element to the first support member.

A6. The system of paragraph A5, wherein the first crossbeam support assembly further includes a sleeve fixedly mounted to one of the first crossbeam support element and the first support member, and the pivot pin is pivotingly supported in the sleeve and supported by the other of the first crossbeam support element and the first support member.

A7. The system of paragraph A1, wherein the first support, the first crossbeam support assembly, and the crossbeam are collectively configured to allow the crossbeam to move laterally of the first support. It should be understood that the "first support" and "first crossbeam support assembly" in this example refer, respectively, to the "second support" and "second crossbeam support assembly" as described above since only one support and crossbeam support assembly are mentioned in this combination.

A8. The system of paragraph A1, further comprising a second lift mechanism configured to move the second crossbeam support assembly along the second support in response to a third control signal; and wherein the electronic controller is operatively coupled to the second lift mechanism and configured to generate the third control signal controlling operation of the second lift mechanism to move the second crossbeam support assembly along the second support, to thereby change the position of the vehicle component relative to the vehicle.

B1. A method of moving a vehicle component of a vehicle relative to a structure of the vehicle during installation of the component on the structure, the method comprising the steps of:

attaching a lift frame to the vehicle component, wherein the lift frame includes a crossbeam and a pair of spaced-apart cambered truss assemblies attached to the crossbeam, and attaching the lift frame to the vehicle component includes securing the pair of truss assemblies to the vehicle component at a plurality of spaced locations;

supporting a first end of the crossbeam with a first crossbeam support assembly;

moving by a first lift mechanism in response to a first control signal the vehicle component by moving the first crossbeam support assembly along a first support mounted to and extending upwardly from a base supported on a work surface;

rotating by a rotational drive mechanism in response to a second control signal the lift frame and the attached vehicle component about a beam axis relative to the first crossbeam support assembly to change the orientation of the vehicle component relative to the vehicle; and changing the orientation of the vehicle component relative to the vehicle by generating by an electronic controller the first control signal controlling operation of the first lift mechanism to move the first crossbeam support assembly along the first support, and the second control signal for controlling operation of the rotational drive mechanism to rotate the lift frame and the attached vehicle component relative to the first crossbeam support assembly.

B2. The method of paragraph B1, further comprising the steps of:

receiving by the electronic controller input information related to alignment of a first laser and second laser positioned proximate the vehicle component with respect to a target installation point on the vehicle structure, which input information is representative of an objective position and orientation of the vehicle component relative to the vehicle structure;

generating by the electronic controller in response to the received input information the first control signal for controlling operation of the first lift mechanism to move the first crossbeam support assembly along the first support; and generating by the electronic controller in response to the received input information the second control signal for controlling operation of the rotational drive mechanism to rotate the crossbeam and the attached vehicle component relative to the first crossbeam support assembly.

B3. The method of paragraph B1, further comprising the steps of:

receiving by the electronic controller input information associated with an objective position of the vehicle component;

in response to the received input information, generating the first control signal for controlling operation of the first lift mechanism to move the first crossbeam support assembly along the first support; and generating the second control signal for controlling operation of the rotational drive mechanism to rotate the crossbeam relative to the first crossbeam support assembly to rotationally position the vehicle component when supported by the lift frame.

B4. The method of paragraph B1, wherein moving the first crossbeam support assembly along the first support includes pivoting the crossbeam relative to the first support about a first pivot axis that is transverse to the beam axis.

B5. The method of paragraph B4, wherein pivoting the crossbeam relative to the first support includes supporting the crossbeam by a first crossbeam support element, supporting a first support member by the first lift mechanism for movement along a first lift line along the first support, and pivoting the first crossbeam support element about a pivot pin pivotingly coupling the first crossbeam support element to the first support member.

B6. The method of paragraph B5, further comprising the step of moving the first crossbeam support element relative to the first support member along a lateral line transverse to the first lift line.

B7. The method of paragraph B1, further comprising the step of moving the crossbeam laterally of the first support.

B8. The method of paragraph B1, further comprising the steps of supporting a second end of the crossbeam with a second crossbeam support assembly movable along a second support mounted to and extending upwardly from the base, moving the second crossbeam support assembly along the second support by a second lift mechanism in response to a third control signal, and generating by the electronic controller the third control signal controlling operation of the second lift mechanism to move the second crossbeam support assembly along the second support, to thereby change the position of the vehicle component relative to the vehicle.

C1. A system for moving a vehicle component of a vehicle relative to a structure of the vehicle during installation of the component on the structure, the system comprising:

spaced-apart first and second supports mounted to a base on opposite sides of a component bay region of the base, the first and second supports extending upwardly from the base;

a lift frame including a crossbeam extending along a crossbeam line between the first and second supports, and a pair of spaced-apart cambered truss assemblies secured to the crossbeam and configured to be attached to and support the vehicle component relative to the crossbeam;

a first and second crossbeam support assemblies on the first and second supports, configured to support the crossbeam relative to the first and second supports, the first and second crossbeam support assemblies being movable along the first and second supports;

a first lift mechanism configured to move the first crossbeam support assembly along the first support in response to a first control signal;

a second lift mechanism configured to move the second crossbeam support assembly along the second support in response to a second control signal; and an electronic controller operatively coupled to the first and second lift mechanisms, configured to generate the first control signal controlling operation of the first lift mechanism to move the first crossbeam support assembly along the first support, and to generate the second control signal controlling operation of the second lift mechanism to move the second crossbeam support assembly along the second support, to thereby change the position of the vehicle component relative to the vehicle.

C2. The system of paragraph C1, wherein the electronic controller is configured to receive input information associated with an objective position of the vehicle component, and in response to the received input information to generate the first control signal for controlling operation of the first lift mechanism to move the first crossbeam support assembly along the first support, and generate the second control signal for controlling operation of the second lift mechanism to move the second crossbeam support assembly along the second support.

C3. The system of paragraph C1, wherein the first support, the first crossbeam support assembly, and the crossbeam are collectively configured to allow the crossbeam to pivot about a first pivot axis that is transverse to the crossbeam line.

C4. The system of paragraph C1, wherein the first support, the first crossbeam support assembly, and the crossbeam are collectively configured to allow the crossbeam to move laterally of the first support. It should be understood that the "first support" and "first crossbeam support assembly" in this example refer, respectively, to the "second support" and "second crossbeam support assembly" as described above since only one support and crossbeam support assembly are mentioned in this combination.

D1. A system for moving a vehicle component of a vehicle relative to a structure of the vehicle during installation of the component on the structure, the system comprising:

spaced-apart first and second supports mounted to a base on opposite sides of a component bay region of the base, the first and second supports extending upwardly from the base;

a lift frame including a crossbeam extending between the first and second supports along a beam axis, and a pair of spaced-apart cambered truss assemblies secured to the crossbeam and configured to be attached to and support the vehicle component relative to the crossbeam;

first and second crossbeam support assemblies on the first and second supports, configured to support the crossbeam for rotation of the crossbeam relative to the first and second supports, the first and second crossbeam support assemblies being movable along the first and second supports;

a first lift mechanism configured to move the first crossbeam support assembly along the first support in response to a first control signal;

a rotational drive mechanism configured to rotate the crossbeam about the beam axis relative to the first and second crossbeam support assemblies in response to a second control signal; and an electronic controller operatively coupled to the first lift mechanism and the rotational drive mechanism, configured to generate the first control signal controlling operation of the first lift mechanism to move the first crossbeam support assembly along the first support, and to generate the second control signal controlling operation of the rotational drive mechanism to rotate the crossbeam relative to the first crossbeam support assembly, to thereby change the position of the vehicle component relative to the vehicle.

D2. The system of paragraph D1, wherein the electronic controller is configured to receive input information associated with an objective position of the vehicle component, and in response to the received input information to generate the first control signal for controlling operation of the first lift mechanism to move the first crossbeam support assembly along the first support, and generate the second control signal for controlling operation of the rotational drive mechanism to rotate the crossbeam relative to the first crossbeam support assembly to rotationally position the vehicle component when supported by the lift frame.

D3. The system of paragraph D1, wherein the first and second crossbeam support assemblies include a tubular outer support beam extending between the first and second supports, with the support beam enclosing the crossbeam.

D4. The system of paragraph D3, wherein each truss assembly of the pair of truss assemblies extend from the crossbeam through an opening in the support beam.

D5. The system of paragraph D1, wherein the first support, the first crossbeam support assembly, and the crossbeam are collectively configured to allow the crossbeam to pivot about a first pivot axis that is transverse to the beam axis.

D6. The system of paragraph D5, wherein the first crossbeam support assembly includes a first crossbeam support element supporting the crossbeam, a first support member supported by the first lift mechanism for movement along a first lift line along the first support, and a pivot pin pivotingly coupling the first crossbeam support element to the first support member.

D7. The system of paragraph D6, wherein the first crossbeam support assembly further includes a sleeve fixedly mounted to one of the first crossbeam support element and the first support member, and the pivot pin is pivotingly supported in the sleeve and supported by the other of the first crossbeam support element and the first support member.

D8. The system of paragraph D7, wherein the second crossbeam support assembly includes a second crossbeam support element supporting the crossbeam and a second support member configured to move along a second lift line along the second support, and the second crossbeam support element and the second support member are configured to allow the second crossbeam support element to move relative to the second support member along a lateral line transverse to the second lift line.

D9. The system of paragraph D8, wherein the second crossbeam support element and the second support member are further configured to allow the second crossbeam support element to pivot relative to the second support member about a second pivot axis that is transverse to the beam axis.

D10. The system of paragraph D6, wherein the first crossbeam support element and the first support member are configured to allow the first crossbeam support element to move relative to the first support member along a lateral line transverse to the first lift line.

D11. The system of paragraph D1, wherein the first support, the first crossbeam support assembly, and the crossbeam are collectively configured to allow the crossbeam to move laterally of the first support. It should be understood that the "first support" and "first crossbeam support assembly" in this example refer, respectively, to the "second support" and "second crossbeam support assembly" as described above since only one support and crossbeam support assembly are mentioned in this combination.

D12. The system of paragraph D1, further comprising a second lift mechanism configured to move the second crossbeam support assembly along the second support in response to a third control signal; and wherein the electronic controller is operatively coupled to the second lift mechanism and configured to generate the third control signal controlling operation of the second lift mechanism to move the second crossbeam support assembly along the second support, to thereby change the position of the vehicle component relative to the vehicle.

E1. A method of moving a vehicle component of a vehicle relative to a structure of the vehicle during installation of the component on the structure, the method comprising the steps of:

attaching a lift frame to the vehicle component, wherein the lift frame includes a crossbeam and a pair of spaced-apart cambered truss assemblies attached to the crossbeam, and attaching the lift frame to the vehicle component includes securing the pair of truss assemblies to the vehicle component at a plurality of spaced locations;

supporting a first end of the crossbeam with a first crossbeam support assembly;

moving by a first lift mechanism in response to a first control signal the vehicle component by moving the first crossbeam support assembly along a first support mounted to and extending upwardly from a base supported on a work surface;

rotating by a rotational drive mechanism in response to a second control signal the lift frame and the attached vehicle component about a beam axis relative to the first crossbeam support assembly to change the orientation of the vehicle component relative to the vehicle; and changing the orientation of the vehicle component relative to the vehicle by generating by an electronic controller the first control signal controlling operation of the first lift mechanism to move the first crossbeam support assembly along the first support, and the second control signal for controlling operation of the rotational drive mechanism to rotate the lift frame and the attached vehicle component relative to the first crossbeam support assembly.

E2. The method of paragraph E1, further comprising the steps of:

receiving by the electronic controller input information related to alignment of a first laser and second laser positioned proximate the vehicle component with respect to a target installation point on the vehicle structure, which input information is representative of an objective position and orientation of the vehicle component relative to the vehicle structure;

generating by the electronic controller in response to the received input information the first control signal for controlling operation of the first lift mechanism to move the first crossbeam support assembly along the first support; and generating by the electronic controller in response to the received input information the second control signal for controlling operation of the rotational drive mechanism to rotate the crossbeam and the attached vehicle component relative to the first crossbeam support assembly.

E3. The method of paragraph E1, further comprising the steps of:

receiving by the electronic controller input information associated with an objective position of the vehicle component;

in response to the received input information, generating the first control signal for controlling operation of the first lift mechanism to move the first crossbeam support assembly along the first support; and generating the second control signal for controlling operation of the rotational drive mechanism to rotate the crossbeam relative to the first crossbeam support assembly to rotationally position the vehicle component when supported by the lift frame.

E4. The method of paragraph E1, wherein supporting the first end of the crossbeam with the first crossbeam support assembly further comprises enclosing the crossbeam in a tubular outer support beam.

E5. The method of paragraph E4, wherein rotating the crossbeam of the lift frame and the attached vehicle component relative to the first crossbeam support assembly includes extending each truss assembly of the pair of truss assemblies from the crossbeam through an opening in the support beam.

E6. The method of paragraph E1, wherein moving the first crossbeam support assembly along the first support includes pivoting the crossbeam relative to the first support about a first pivot axis that is transverse to the beam axis.

E7. The method of paragraph E6, wherein pivoting the crossbeam relative to the first support includes supporting the crossbeam by a first crossbeam support element, supporting a first support member by the first lift mechanism for movement along a first lift line along the first support, and pivoting the first crossbeam support element about a pivot pin pivotingly coupling the first crossbeam support element to the first support member.

E8. The method of paragraph E7, wherein pivoting the crossbeam support element about the pivot pin includes pivoting the pivot pin in a sleeve fixedly mounted to one of the first crossbeam support element and the first support member.

E9. The method of paragraph E8, further comprising the steps of:

supporting a second end of the crossbeam with a second crossbeam support assembly movable along a second support mounted to and extending upwardly from the base, wherein the second crossbeam support assembly includes a second crossbeam support element supporting the second end of the crossbeam and a second support member supported for movement along a second lift line along the second support; and moving the second crossbeam support element relative to the second support member along a lateral line transverse to the second lift line.

E10. The method of paragraph E9, further comprising the step of pivoting the second crossbeam support element relative to the second support member about a second pivot axis that is transverse to the beam axis.

E11. The method of paragraph E7, further comprising the step of moving the first crossbeam support element relative to the first support member along a lateral line transverse to the first lift line.

E12. The method of paragraph E1, further comprising the step of moving the crossbeam laterally of the first support.

E13. The method of paragraph E1, further comprising the steps of supporting a second end of the crossbeam with a second crossbeam support assembly movable along a second support mounted to and extending upwardly from the base, moving the second crossbeam support assembly along the second support by a second lift mechanism in response to a third control signal, and generating by the electronic controller the third control signal controlling operation of the second lift mechanism to move the second crossbeam support assembly along the second support, to thereby change the position of the vehicle component relative to the vehicle.

F1. A system for moving a vehicle component of a vehicle relative to a structure of the vehicle during installation of the component on the structure, the system comprising:

spaced-apart first and second supports mounted to a base on opposite sides of a component bay region of the base, the first and second supports extending upwardly from the base;

a lift frame including a crossbeam extending along a crossbeam line between the first and second supports, and a pair of spaced-apart cambered truss assemblies secured to the crossbeam and configured to be attached to and support the vehicle component relative to the crossbeam;

a first and second crossbeam support assemblies on the first and second supports, configured to support the crossbeam relative to the first and second supports, the first and second crossbeam support assemblies being movable along the first and second supports;

a first lift mechanism configured to move the first crossbeam support assembly along the first support in response to a first control signal;

a second lift mechanism configured to move the second crossbeam support assembly along the second support in response to a second control signal; and an electronic controller operatively coupled to the first and second lift mechanisms, configured to generate the first control signal controlling operation of the first lift mechanism to move the first crossbeam support assembly along the first support, and to generate the second control signal controlling operation of the second lift mechanism to move the second crossbeam support assembly along the second support, to thereby change the position of the vehicle component relative to the vehicle.

F2 The system of F1, wherein the electronic controller is configured to receive input information associated with an objective position of the vehicle component, and in response to the received input information to generate the first control signal for controlling operation of the first lift mechanism to move the first crossbeam support assembly along the first support, and generate the second control signal for controlling operation of the second lift mechanism to move the second crossbeam support assembly along the second support.

F3. The system of paragraph F1, wherein the first and second crossbeam support assemblies include a tubular outer support beam extending between the first and second supports, with the support beam enclosing the crossbeam.

F4. The system of paragraph F3, wherein each truss assembly of the pair of truss assemblies extend from the crossbeam through an opening in the support beam.

F5. The system of paragraph F1, wherein the first support, the first crossbeam support assembly, and the crossbeam are collectively configured to allow the crossbeam to pivot about a first pivot axis that is transverse to the crossbeam line.

F6. The system of paragraph F5, wherein the first crossbeam support assembly includes a first crossbeam support element supporting the crossbeam, a first support member supported by the first lift mechanism for movement along the first lift line along the first support, and a pivot pin pivotingly coupling the first crossbeam support element to the first support member.

F7. The system of paragraph F6, wherein the first crossbeam support assembly further includes a sleeve fixedly mounted to one of the first crossbeam support element and the first support member, and the pivot pin is pivotingly supported in the sleeve and supported by the other of the first crossbeam support element and the first support member.

F8. The system of paragraph F7, wherein the second crossbeam support assembly includes a second crossbeam support element supporting the crossbeam and a second support member supported by the second lift mechanism for movement along a second lift line along the second support, and the second crossbeam support element and the second support member are configured to allow the second crossbeam support element to move relative to the second support member along a lateral line transverse to the second lift line.

F9. The system of paragraph F8, wherein the second crossbeam support element and the second support member are further configured to allow the second crossbeam support element to pivot relative to the second support member about a second pivot axis that is transverse to the crossbeam line.

F10. The system of paragraph F6, wherein the first crossbeam support element and the first support member are configured to allow the first crossbeam support element to move relative to the first support member along a lateral line transverse to the first lift line.

F11. The system of paragraph F1, wherein the first support, the first crossbeam support assembly, and the crossbeam are collectively configured to allow the crossbeam to move laterally of the first support. It should be understood that the "first support" and "first crossbeam support assembly" in this example refer, respectively, to the "second support" and "second crossbeam support assembly" as described above since only one support and crossbeam support assembly are mentioned in this combination.

G1. A method of moving a vehicle component of a vehicle relative to a structure of the vehicle during installation of the component on the structure, the method comprising the steps of:

attaching the vehicle component to a lift frame including a crossbeam and a pair of cambered truss assemblies being secured to the crossbeam and attached to the vehicle component at a plurality of spaced locations;

supporting, with first and second crossbeam support assemblies, the crossbeam relative to first and second supports mounted to and extending upwardly from a base supported on a work surface;

moving by a first lift mechanism in response to a first control signal the vehicle component by moving the first crossbeam support assembly along the first support; and moving by a second lift mechanism in response to a second control signal the vehicle component by moving the second crossbeam support assembly along the second support.

G2. The method of paragraph G1, further comprising the step of generating by an electronic controller the first control signal for controlling operation of the first lift mechanism to move the first crossbeam support assembly along the first support, and the second control signal for controlling operation of the second lift mechanism to move the second crossbeam support assembly along the second support.

G3. The method of paragraph G1, further comprising the steps of:

receiving by an electronic controller input information related to alignment of a first laser and second laser positioned proximate the vehicle component with respect to a target installation point on the vehicle structure, which input information is representative of an objective position of the vehicle component;

generating by the electronic controller in response to the received input information the first control signal for controlling operation of the first lift mechanism to move the first crossbeam support assembly along the first support; and generating by the electronic controller in response to the received input information the second control signal for controlling operation of the second lift mechanism to move the second crossbeam support assembly along the second support.

G4. The method of paragraph G1, wherein moving the first crossbeam support assembly along the first support includes pivoting the crossbeam relative to the first support about a first pivot axis that is transverse to a crossbeam line extending along the crossbeam between the first and second crossbeam support assemblies.

G5. The method of paragraph G4, wherein pivoting the crossbeam relative to the first support includes supporting the crossbeam by a first crossbeam support element, supporting a first support member by the first lift mechanism for movement along a first lift line along the first support, and pivoting the first crossbeam support element supporting the crossbeam about a pivot pin pivotingly coupling the first crossbeam support element to the first support member.

G6. The method of paragraph G5, wherein supporting the crossbeam to pivot about the pivot pin includes pivotingly supporting the pivot pin in a sleeve fixedly mounted to one of the first crossbeam support element and the first support member.

G7. The method of paragraph G6, wherein supporting the crossbeam with the second crossbeam support assembly includes supporting the crossbeam with a second crossbeam support element and supporting a second support member for movement along a second lift line along the second support; and the method further comprises the step of moving the second crossbeam support element relative to the second support member along a lateral line transverse to the second lift line.

G8. The method of paragraph G7, further comprising the step of pivoting the second crossbeam support element relative to the second support member about a second pivot axis that is transverse to the crossbeam line.

G9. The method of paragraph G5, further comprising the step of moving the first crossbeam support element relative to the first support member along a lateral line transverse to the first lift line.

G10. The method of paragraph G1, further comprising the step of moving the crossbeam laterally of the first support.

G11. The method of paragraph G1, wherein supporting the first end of the crossbeam with the first crossbeam support assembly further comprises enclosing the crossbeam in a tubular outer support beam.

G12. The method of paragraph G11, wherein supporting the first end of the crossbeam with the first crossbeam support assembly further includes extending each truss assembly of the pair of truss assemblies from the crossbeam through an opening in the support beam.

H1. A positioning system for positioning an engine component for attachment to an engine of an aircraft, comprising:
a pair of spaced-apart upright supports configured to be mounted to a base on opposite sides of a component bay region of the base;
a lift frame including a frame crossbeam and a pair of cambered trusses having respective apexes, the trusses being secured at their apexes at spaced-apart positions to the frame crossbeam, and having distal ends configured to be secured at spaced-apart positions to the engine component;
a crossbeam support on which the frame crossbeam is supported for rotation relative to the crossbeam support; wherein the crossbeam support is supported and configured for relative movement along the pair of upright supports;
a lift mechanism configured to move the crossbeam support along at least one upright support of the pair of upright supports;
a rotational drive configured to rotate the frame crossbeam relative to the crossbeam support;
a laser assembly configured to support a first laser and a second laser at a known distance apart along a reference line, the laser assembly being configured to be positioned relative to the engine component with the reference line oriented vertically, the first and second lasers being individually adjustable in a respective plane including the reference line to align a respective laser beam of each of the first and second lasers with a target position on the aircraft associated with the aircraft engine, with the laser assembly providing a first indication representative of a first angle of the laser beam of the first laser relative to the reference line and a second indication representative of a second angle of the laser beam of the second laser relative to the reference line; and
a system controller configured to (a) control operation of the rotational drive to rotate the frame crossbeam relative to the crossbeam support to rotationally position the engine component secured to the lift frame, (b) determine a vertical distance between the engine component and the target position on the aircraft based at least in part on the first and second angles and the known distance, and (c) control operation of the lift mechanism to move the crossbeam support along the at least one upright support in a direction that reduces the vertical distance between the engine component and the engine.

H2. The positioning system of paragraph H1, wherein the crossbeam support spans between the pair of upright supports.

H3. The positioning system of paragraph H1, further comprising a base-drive mechanism coupled to the system controller and configured to move the base along a work surface, and wherein the system controller is further configured to (a) determine a horizontal distance between the engine component and the target position on the aircraft based at least in part on the first and second angles and the known distance, and (b) control operation of the base-drive mechanism to move the base along the work surface in a direction that reduces the horizontal distance between the engine component and the engine.

H4. The positioning system of paragraph H1, where the engine component mounts to the aircraft with a hinge including a first hinge component on the aircraft and a second hinge component on the engine component, and the target position on the aircraft is a position of the first hinge component, and the laser assembly is configured to be positioned relative to the engine component with the first laser positioned proximate to the second hinge component.

H5. The positioning system of paragraph H4, wherein the laser assembly is configured to support the first and second lasers in a deployed configuration with the first laser positioned proximate to the second hinge component, and additionally configured to be adjusted to support the first and second lasers in a retracted configuration in which the first and second lasers are spaced away from the engine component.

H6. The positioning system of paragraph H5, wherein the system controller is configured to control operation of the base-drive mechanism while the lasers are in the retracted configuration.

I1. A method of positioning an engine component for attachment to an engine of an aircraft, the method comprising:
attaching the engine component to a lift frame including a frame crossbeam and a pair of cambered trusses having respective apexes, the trusses being secured at their apexes at spaced-apart positions to the frame crossbeam, and having distal ends secured at spaced-apart positions to the engine component;
moving by a lift mechanism the engine component by moving a crossbeam support within which the frame crossbeam is supported; the crossbeam support configured for relative movement along two upright supports extending upwardly from a base;
rotating by a rotational drive the lift frame and the attached engine component relative to the crossbeam support to orient the engine component relative to the engine;
supporting first and second lasers vertically spaced apart a known distance proximate to the engine component;

directing a first laser beam emitted by the first laser and a second laser beam emitted by the second laser at a target position on the aircraft associated with the aircraft engine;

determining a first angle of the first laser beam relative to a reference line containing the first and second lasers, and a second angle of the second laser beam relative to the reference line;

determining, by an electronic system controller having a processor, a vertical distance between the first laser and the target position on the aircraft based at least in part on the first and second angles and the known distance; and controlling operation of the lift mechanism to move the crossbeam support along the at least one upright support in a direction that reduces the vertical distance between the engine component and the engine.

I2. The method of paragraph I1, further comprising (a) determining by the system controller a horizontal distance between the engine component and the target position on the aircraft based at least in part on the first and second angles and the known distance, and (b) controlling operation of a base-drive mechanism coupled to the system controller and configured to move the base along a work surface, in a manner moving the base along the work surface in a direction that reduces the horizontal distance between the engine component and the engine.

I3. The method of paragraph I2, further comprising moving the first and second lasers away from the engine component after determining the first angle of the first laser beam and the second angle of the second laser beam and before controlling operation of the base-drive mechanism to move the crossbeam support along the work surface.

I4. The method of paragraph I1, wherein supporting the first and second lasers proximate to the engine component includes positioning the first laser proximate to a first hinge component of a hinge used to mount the engine component to the aircraft with the hinge including the first hinge component on the engine component and a second hinge component on the aircraft, and the target position on the aircraft is a position of the second hinge component.

I5. The method of paragraph I4, further comprising aligning the first hinge component to the second hinge component and securing the first hinge component to the second hinge component.

I6. The method of paragraph I4, further comprising moving the first and second lasers away from the engine component after determining the first angle of the first laser beam and the second angle of the second laser beam and before controlling operation of the lift mechanism to move the crossbeam support along the at least one upright support in a direction that reduces the vertical distance between the engine component and the engine.

I7. The method of paragraph I6, wherein the system controller is configured to control operation of the base-drive mechanism after the first and second lasers have been moved away from the engine component.

J1. A method of installing a component of a vehicle to a structure of the vehicle with an installation location on the component positioned at an installation location on the structure of the vehicle, the method comprising:

supporting the component by a carrier;

moving the component supported on the carrier to a position proximate to the installation location on the structure of the vehicle;

supporting first and second vision elements of a vision system in respective first and second element positions relative to an installation location on the component, the first and second element positions being a known vision-element distance apart and defining a vision-element line that has a known orientation relative to the component;

directing by the vision system a first beam of radiant energy between the first vision element and a target at a target location on the structure having a known relationship to the installation location on the structure, and a second beam of radiant energy between the second vision element and the target;

determining by the vision system a first determined angle of the first beam relative to the vision-element line and a second determined angle of the second beam relative to the vision-element line;

determining, by a controller coupled to the vision system, the length of at least the first beam based at least in part on the first and second angles and the vision-element distance; and controlling movement of the carrier by the controller, based at least in part on the length of the first beam, to move the component relative to the structure in a manner reducing the distance between the installation location on the component and the installation location on the structure.

J2. The method of paragraph J1, further comprising determining from the length of the first beam, a distance between the first vision-element and the third vision element along a first line perpendicular to the vision-element line.

J3. The method of paragraph J2, wherein and the first line is parallel to a surface supporting the carrier.

J4. The method of paragraph J3, wherein the vision-element line is perpendicular to the surface supporting the carrier.

J5. The method of paragraph J1, further comprising determining from the length of the first beam, a distance between the first vision-element and the third vision element along a first line parallel to the vision-element line.

J6. The method of paragraph J5, wherein and the first line is perpendicular to a surface supporting the carrier.

J7. The method of paragraph J1, further comprising determining from the length of the first beam, a distance between the installation location on the component and the installation location on the structure.

J8. The method of paragraph J7, further comprising determining from the length of the first beam, a determined direction of the installation location on the structure from the installation location on the component.

J9. The method of paragraph J8, wherein controlling movement of the carrier to move the component includes controlling movement of the carrier to move the component in the determined direction of the installation location on the structure from the installation location on the component.

K1. A system for installing a component of a vehicle to a structure of the vehicle with an installation location on the component positioned at an installation location on the structure of the vehicle, the system comprising:

a carrier assembly configured to support the component, and move the supported component to a position proximate to the installation location on the structure of the vehicle;

a vision assembly including a vision processor, first and second vision elements, and a frame, whereby the frame supports the first and second vision elements a known vision-element distance apart, the first and second vision elements having respective vision-element positions defining a vision-element line having a known orientation and position relative to an installation location on the component when the vision assembly is mounted in a known position and orientation relative to the supported component, the vision processor being configured to direct a first beam of radiant energy between the first vision element and a target located on the structure at a target location having a known relationship to the installation location on the structure; and a second beam of radiant energy between the second vision element and the target, and detect a first angle of the first beam relative to the vision-element line and a second angle of the second beam relative to the vision-element line; and a controller operatively coupled to the vision system and the carrier configured to determine a length of at least the first beam based at least in part on the first and second angles and the vision-element distance, and control movement of the carrier based at least in part on the length of the first beam to move the component relative to the structure in a manner reducing the distance between the installation location on the component and the installation location on the structure.

Advantages, Features, Benefits

The different embodiments of the moving and positioning systems described herein provide several advantages over known solutions for assembling or servicing large vehicles, such as commercial aircraft, and in particular aircraft power plant components.

For example, the illustrative embodiments of the moving systems described herein allow large pieces of aircraft structure to be lifted, transported, and brought into position adjacent the aircraft without required an overhead crane or hoist, and without requiring service personnel to direct the typically heavy structure by hand while it is installed. The disclosed moving systems eliminate the need for supplemental movement aids such as cranes, hoists, and even muscle power.

Additionally, and among other benefits, the configuration of the base of the illustrative moving system permits the moving system to straddle a vehicle component while it remains on a pallet or other shipping platform, and secure it for lifting. Once secured, the vehicle component can be lifted, translated, and rotated independently while secured, allowing the vehicle component to be oriented as necessary to match the aircraft's orientation.

The addition of a work platform to the moving system provides mechanics and service personnel to be close to the points of engagement between engine components and the aircraft, without requiring personnel to balance upon the aircraft itself, or to be stationed below a suspended load.

Yet additionally, the illustrative positioning system disclosed herein employs optical guidance for automated or semi-automated positioning of an engine component—including fine adjustments—without requiring any personnel to be in or near the gap between the engine component and the aircraft. Furthermore, the necessary position adjustments needed to install engine components can be made without relying on unaided eyesight, or professional expertise to achieve component alignment.

No known system or device can perform these functions, particularly in conjunction with commercial aircraft. Thus, the illustrative embodiments described herein are particularly useful for the construction or maintenance of commercial aircraft. However, not all embodiments described herein provide the same advantages or the same degree of advantage.

Conclusion

Ordinal indicators, such as first, second or third, for identified elements are used to distinguish between the elements, and do not indicate a required or limited number of such elements, and do not indicate a particular position or order of such elements unless otherwise specifically stated. Ordinal indicators may be applied to associated elements in the order in which they are introduced in a given context, and the ordinal indicators for such elements may be different in different contexts.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:

1. A system for moving a vehicle component of a vehicle relative to a structure of the vehicle during installation of the component on the structure, the system comprising:

spaced-apart first and second supports mounted to a base on opposite sides of a component bay region of the base, the first and second supports extending upwardly from the base;

a lift frame including a crossbeam enclosed within an outer support beam, extending between the first and second supports along a beam axis central to the crossbeam, and a pair of spaced-apart cambered truss assemblies secured to the crossbeam and configured to be attached to and support the vehicle component relative to the crossbeam;

first and second crossbeam support assemblies on the first and second supports, configured to support the crossbeam for movement of the crossbeam along respective open passageways in the first and second supports, and to support the crossbeam for movement rotationally around the beam axis that is central to the crossbeam, and rotationally around a transverse axis orthogonal to, and intersecting the beam axis;

wherein the first crossbeam support assembly is configured to be moved along the first support in response to a first control signal; and the crossbeam is configured to be rotated about the beam axis relative to the first and second crossbeam support assemblies in response to a second control signal; and an electronic controller operatively configured to generate the first control signal controlling movement of the first crossbeam support assembly along the first support, and to generate the second control signal controlling rotation of the crossbeam relative to the first crossbeam support assembly, to thereby change a position of the vehicle component relative to the vehicle.

2. The system of claim 1, wherein the electronic controller is configured to receive input information associated with an objective position of the vehicle component, and in response to the received input information to generate the first control signal for controlling movement of the first crossbeam support assembly along the first support, and generate the second control signal for controlling rotation of the crossbeam relative to the first crossbeam support assembly to rotationally position the vehicle component when supported by the lift frame.

3. The system of claim 1, wherein the first support, the first crossbeam support assembly, and the crossbeam are collectively configured to allow the crossbeam to move laterally of the first support.

4. The system of claim 1, wherein each truss assembly of the pair of truss assemblies extend from the crossbeam through an opening in the outer support beam.

5. The system of claim 1, wherein the second crossbeam support assembly is configured to move along the second support in response to a third control signal; and the electronic controller is operatively configured to generate the third control signal controlling movement of the second crossbeam support assembly along the second support, to thereby change the position of the vehicle component relative to the vehicle.

6. The system of claim 5, wherein the second support, the second crossbeam support assembly, and the crossbeam are collectively configured to allow the crossbeam to pivot as well as move laterally of the second support.

7. The system of claim 6, wherein the second crossbeam support assembly includes a second crossbeam support element supporting the crossbeam, a second support member supported for movement along a second lift line along the second support, and a pivot pin pivotingly coupling the second crossbeam support element to the second support member.

8. The system of claim 7, wherein the second crossbeam support assembly is partially disposed within the second support.

9. The system of claim 1, wherein a first portion of the first crossbeam support assembly is enclosed within the first support, a second portion of the first crossbeam support assembly is disposed outside of the first support, and the first portion is connected to the second portion via a connecting pin.

10. The system of claim 9, wherein the connecting pin is aligned orthogonal to the beam axis, and is configured for up-down movement in the open passageway in the first support.

11. The system of claim 10, wherein the connecting pin is configured for lateral movement on a support member.

12. The system of claim 1, wherein the first support, the first crossbeam support assembly, and the crossbeam are collectively configured to allow the crossbeam to move along a first lift line along the first support.

13. The system of claim 12, wherein the first crossbeam support assembly includes a first crossbeam support element supporting the crossbeam, a first support member supported for movement along the first lift line, and a pivot pin pivotingly coupling the first crossbeam support element to the first support member.

14. The system of claim 13, wherein the first crossbeam support element and the first support member are configured to allow the first crossbeam support element to move relative to the first support member along a lateral line transverse to the first lift line.

15. The system of claim 13, wherein the first crossbeam support assembly further includes a sleeve fixedly mounted to one of the first crossbeam support element and the first support member, and the pivot pin is pivotingly supported in the sleeve and supported by the other of the first crossbeam support element and the first support member.

16. The system of claim 15, wherein the second crossbeam support assembly includes a second crossbeam support element supporting the crossbeam and a second support member configured to move along a second lift line along the second support, and the second crossbeam support element and the second support member are configured to allow the second crossbeam support element to move relative to the second support member along a lateral line transverse to the second lift line.

17. The system of claim 16, wherein the second crossbeam support element and the second support member are further configured to allow the second crossbeam support element to pivot relative to the second support member about a second pivot axis that is transverse to the beam axis.

18. A system for moving a vehicle component of a vehicle relative to a structure of the vehicle during installation of the component on the structure, the system comprising:
spaced-apart first and second supports mounted to a base on opposite sides of a component bay region of the base, the first and second supports extending upwardly from the base;
a lift frame including a crossbeam enclosed within an outer support beam, extending along a crossbeam line central to the crossbeam, between the first and second supports, and a pair of spaced-apart cambered truss assemblies secured to the crossbeam and configured to be attached to and support the vehicle component relative to the crossbeam;
first and second crossbeam support assemblies on the first and second supports, configured to support the crossbeam relative to the first and second supports, the first and second crossbeam support assemblies being movable along respective open passageways in the first and second supports;
wherein the first crossbeam support assembly is configured to be moved along the first support in response to a first control signal;
and the second crossbeam support assembly is configured to be moved independently from the first crossbeam support assembly, along the second support in response to a second control signal; and
an electronic controller operatively configured to generate the first control signal controlling movement of the first crossbeam support assembly along the first support, and to generate the second control signal controlling movement of the second crossbeam support assembly along the second support, to thereby change a position of the vehicle component relative to the vehicle.

19. The system of 18, wherein the electronic controller is configured to receive input information associated with an objective position of the vehicle component, and in response to the received input information to generate the first control signal for controlling movement of the first crossbeam support assembly along the first support, and generate the second control signal for controlling movement of the second crossbeam support assembly along the second support.

20. The system of claim 18, wherein the first support, the first crossbeam support assembly, and the crossbeam are collectively configured to allow the crossbeam to pivot about a first pivot axis that is transverse to the crossbeam line.

21. The system of claim 18, wherein the first support, the first crossbeam support assembly, and the crossbeam are collectively configured to allow the crossbeam to move laterally of the first support.

22. The system of claim 18, wherein the truss assemblies are capable of attachment to a top side of the vehicle component, then lifting the vehicle component perpendicular to the crossbeam line and rotating the vehicle component at least 90 degrees around the beam axis.

23. The system of claim 18, wherein the entire load of the vehicle component is supported by the crossbeam and the first and second supports.

24. The system of claim 18, wherein the first support, the first crossbeam support assembly, and the crossbeam are collectively configured to allow the crossbeam to move along a first lift line along the first support.

25. A system for moving a vehicle component of a vehicle relative to a structure of the vehicle during installation of the component on the structure, the system comprising:
- a pair of spaced-apart upright supports configured to be mounted to a base on opposite sides of a component bay region of the base;
- a lift frame including a frame crossbeam extending between the upright supports along a rectilinear beam axis and a pair of cambered trusses having respective apexes, the trusses being secured at their apexes at spaced-apart positions to the frame crossbeam, and having distal ends configured to be secured at spaced-apart positions to the vehicle component;
- a crossbeam support on which the frame crossbeam is supported, and configured for movement of the frame crossbeam along the pair of upright supports, rotationally around the beam axis of the frame crossbeam, and rotationally around a transverse axis orthogonal to the beam axis, wherein the crossbeam support contains the frame crossbeam, each of the crossbeam support and the frame crossbeam extending all the way from one of the upright supports to the other upright support, and the crossbeam support being entirely supported and controlled from the pair of spaced-apart upright supports, wherein each upright support has a vertical slot in a front side, and a beam support assembly partially contained inside each of the upright supports, extending through the respective slot and connected to the frame crossbeam.

26. The system of claim 25, wherein the crossbeam support is a cylinder enclosing the frame crossbeam, the apexes of the cambered trusses being connected through openings in the crossbeam support to the frame crossbeam, wherein linear and rotational movement of the frame crossbeam cause corresponding movement of the cambered trusses.

27. A method of moving a vehicle component of a vehicle relative to a structure of the vehicle during installation of the component on the structure, the method comprising the steps of:
- attaching a lift frame to the vehicle component, wherein the lift frame includes a crossbeam enclosed within an outer support beam, and a pair of spaced-apart cambered truss assemblies attached to the crossbeam, the lift frame extending between spaced-apart first and second supports mounted to a base on opposite sides of a component bay region of the base, the supports extending upwardly from the base, and attaching the lift frame to the vehicle component includes securing the pair of truss assemblies to the vehicle component at a plurality of spaced locations;
- supporting a first end of the crossbeam with a first crossbeam support assembly on the first support;
- supporting a second end of the crossbeam with a second crossbeam support assembly on the second support;
- moving in response to a first control signal the vehicle component by moving the first crossbeam support assembly along a first open passageway in the first support;
- rotating in response to a second control signal the crossbeam and the attached vehicle component about a beam axis central to the crossbeam and relative to the first crossbeam support assembly to change the orientation of the vehicle component relative to the vehicle;
- rotating in response to a third control signal the lift frame and the attached vehicle component about a pivot axis orthogonal to the beam axis to change the orientation of the vehicle component relative to the vehicle, and
- changing the orientation of the vehicle component relative to the vehicle by generating by an electronic controller the first control signal controlling movement of the first crossbeam support assembly along the first support, the second control signal for controlling rotation of the crossbeam and the attached vehicle component around the beam axis, and the third control signal for rotating the lift frame and the attached vehicle component around the pivot axis orthogonal to the beam axis.

28. The method of claim 27, further comprising the steps of:
- receiving by the electronic controller input information related to alignment of a first laser and second laser positioned proximate the vehicle component with respect to a target installation point on the vehicle structure, which input information is representative of an objective position and orientation of the vehicle component relative to the vehicle structure;
- generating by the electronic controller in response to the received input information the first control signal for controlling movement of the first crossbeam support assembly along the first support; and
- generating by the electronic controller in response to the received input information the second control signal for controlling rotation of the crossbeam and the attached vehicle component relative to the first crossbeam support assembly.

29. The method of claim 27, further comprising the steps of:
- receiving by the electronic controller input information associated with an objective position of the vehicle component;
- in response to the received input information, generating the first control signal for controlling movement of the first crossbeam support assembly along the first support; and
- generating the second control signal for controlling rotation of the crossbeam relative to the first crossbeam support assembly to rotationally position the vehicle component when supported by the lift frame.

30. The method of claim 27, further comprising the step of moving the crossbeam laterally of the first support.

31. The method of claim 27, further comprising the steps of, moving the second crossbeam support assembly along the second support in response to the third control signal, and generating by the electronic controller the third control signal controlling movement of the second crossbeam support assembly along the second support, to thereby change a position of the vehicle component relative to the vehicle.

\* \* \* \* \*